(12) United States Patent
Feaver et al.

(10) Patent No.: US 10,600,581 B2
(45) Date of Patent: *Mar. 24, 2020

(54) ELECTRIC DOUBLE LAYER CAPACITANCE DEVICE

(71) Applicants: BASF SE, Ludwigshafen (DE); University of Washington, Seattle, WA (US)

(72) Inventors: Aaron M. Feaver, Seattle, WA (US); Guozhong Cao, Seattle, WA (US)

(73) Assignees: BASF SE, Ludwigshafen (DE); University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,415

(22) Filed: Oct. 17, 2018

(65) Prior Publication Data

US 2019/0287737 A1    Sep. 19, 2019

Related U.S. Application Data

(63) Continuation of application No. 14/448,853, filed on Jul. 31, 2014, now Pat. No. 10,141,122, which is a
(Continued)

(51) Int. Cl.
*H01G 11/32* (2013.01)
*H01G 11/84* (2013.01)
(Continued)

(52) U.S. Cl.
CPC ............ *H01G 11/32* (2013.01); *C01B 32/30* (2017.08); *H01G 11/24* (2013.01); *H01G 11/26* (2013.01);
(Continued)

(58) Field of Classification Search
CPC ........ H01G 11/32; H01G 11/46; H01G 11/48; H01G 11/28; H01G 11/26; H01G 11/24;
(Continued)

(56) References Cited

U.S. PATENT DOCUMENTS 3,518,123 A    6/1970  Katsoulis et al.
3,619,428 A    11/1971  David
(Continued)

FOREIGN PATENT DOCUMENTS

CA    2176452 A1    11/1997
CN    1554102 A     12/2004
(Continued)

OTHER PUBLICATIONS

Abánades et al., "Experimental Analysis of Direct Thermal Methane Cracking," *International Journal of Hydrogen Energy* 36(20):12877-12886, 2011.
(Continued)

*Primary Examiner* — David M Sinclair
(74) *Attorney, Agent, or Firm* — Seed Intellectual Property Law Group LLP

(57) ABSTRACT

The present application is directed to electric double layer capacitance (EDLC) devices. In one aspect, the present application is directed to an electrode comprising an activated carbon cryogel having a tunable pore structure wherein: the surface area is at least 1500 m2/g as determined by nitrogen sorption at 77K and BET analysis; and the pore structure comprises a pore volume ranging from about 0.01 cc/g to about 0.25 cc/g for pores having a pore diameter of 0.6 to 1.0 nm. In another aspect, the present application is directed to an Electric Double Layer Capacitor (EDLC) device comprising an activated cryogel.

24 Claims, 21 Drawing Sheets

Related U.S. Application Data continuation of application No. 13/898,341, filed on May 20, 2013, now Pat. No. 8,797,717, which is a continuation of application No. 12/897,969, filed on Oct. 5, 2010, now Pat. No. 8,467,170, which is a continuation of application No. 11/941,015, filed on Nov. 15, 2007, now Pat. No. 7,835,136.

(60) Provisional application No. 60/866,007, filed on Nov. 15, 2006.

(51) Int. Cl.
    *H01G 11/34* (2013.01)
    *H01G 11/26* (2013.01)
    *C01B 32/30* (2017.01)
    *H01G 11/24* (2013.01)

(52) U.S. Cl.
    CPC .............. *H01G 11/34* (2013.01); *H01G 11/84* (2013.01); *Y02E 60/13* (2013.01); *Y02P 20/133* (2015.11); *Y10T 428/24998* (2015.04); *Y10T 428/249978* (2015.04)

(58) Field of Classification Search
    CPC ........ H01G 11/30; H01G 11/86; H01G 11/84; H01G 11/34; C01B 31/08; Y10T 428/249978; Y10T 428/428; Y10T 428/24998
    See application file for complete search history.

(56) References Cited

U.S. PATENT DOCUMENTS

| | | |
|---|---|---|
| 3,876,505 A | 4/1975 | Stoneburner |
| 3,892,580 A | 7/1975 | Messing |
| 3,977,901 A | 8/1976 | Buzzelli |
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pez et al. |
| 4,769,197 A | 9/1988 | Kromrey |
| 4,843,015 A | 6/1989 | Grubbs, Jr. et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 4,999,330 A | 3/1991 | Bose et al. |
| 5,061,416 A | 10/1991 | Willkens et al. |
| 5,093,216 A | 3/1992 | Azuma et al. |
| 5,260,855 A | 11/1993 | Kaschmitter et al. |
| 5,294,498 A | 3/1994 | Omaru et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,614,460 A | 3/1997 | Schwarz et al. |
| 5,626,637 A | 5/1997 | Baker |
| 5,626,977 A | 5/1997 | Mayer et al. |
| 5,670,571 A | 9/1997 | Gabrielson et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Billow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,722,991 B2 | 5/2010 | Zhang et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,293,818 B2 | 10/2012 | Costantino et al. |
| 8,329,252 B2 | 12/2012 | Markavov et al. |
| 8,361,659 B2 | 1/2013 | Richard |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,654,507 B2 | 2/2014 | Costantino et al. |
| 8,691,177 B2 | 4/2014 | Pfeifer et al. |
| 8,709,971 B2 | 4/2014 | Feaver et al. |
| 8,797,717 B2 | 8/2014 | Feaver et al. |
| 8,906,978 B2 | 12/2014 | Costantino et al. |
| 8,916,296 B2 | 12/2014 | Feaver et al. |
| 8,999,202 B2 | 4/2015 | Mulik et al. |
| 9,067,848 B2 | 6/2015 | Stadie et al. |
| 9,112,230 B2 | 8/2015 | Feaver et al. |
| 9,133,295 B2 | 9/2015 | Qureshi et al. |
| 9,133,337 B2 | 9/2015 | Ludvik et al. |
| 9,136,064 B2 | 9/2015 | Gadkaree et al. |
| 9,186,174 B2 | 11/2015 | Krishnan |
| 9,269,502 B2 | 2/2016 | Chang et al. |
| 9,287,556 B2 | 3/2016 | Neumann et al. |
| 9,409,777 B2 | 8/2016 | Geramita et al. |
| 9,412,523 B2 | 8/2016 | Costantino et al. |
| 9,464,162 B2 | 10/2016 | Kron et al. |
| 9,580,321 B2 | 2/2017 | Feaver et al. |
| 9,680,159 B2 | 6/2017 | Feaver et al. |
| 9,714,172 B2 | 7/2017 | Geramita et al. |
| 9,985,289 B2 | 5/2018 | Costantino et al. |
| 10,141,122 B2 | 11/2018 | Feaver et al. |
| 10,147,950 B2 | 12/2018 | Sakshaug et al. |
| 10,195,583 B2 | 2/2019 | Costantino et al. |
| 10,287,170 B2 | 5/2019 | Feaver et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0108785 A1 | 6/2003 | Wu et al. |

(56) References Cited

U.S. PATENT DOCUMENTS

| | | |
|---|---|---|
| 2003/0170548 A1 | 9/2003 | Otsuki et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa et al. |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0058907 A1 | 3/2005 | Kurihara et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0266990 A1 | 12/2005 | Iwasaki et al. |
| 2005/0282062 A1 | 12/2005 | Manako et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0142222 A1 | 6/2007 | Erkey et al. |
| 2007/0166602 A1 | 7/2007 | Burchardt |
| 2008/0011986 A1 | 1/2008 | Yamakawa et al. |
| 2008/0044726 A1 | 2/2008 | Feng et al. |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2011/0111284 A1 | 5/2011 | Maeshima et al. |
| 2011/0177393 A1 | 7/2011 | Park et al. |
| 2011/0200848 A1 | 8/2011 | Chiang et al. |
| 2011/0281180 A1 | 11/2011 | Kim et al. |
| 2011/0287189 A1 | 11/2011 | Shembel et al. |
| 2012/0045685 A1 | 2/2012 | Seki et al. |
| 2012/0129049 A1 | 5/2012 | Rayner |
| 2012/0156567 A1 | 6/2012 | Ayme-Perrot et al. |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0004841 A1 | 1/2013 | Thompkins et al. |
| 2013/0082213 A1 | 4/2013 | Duncan et al. |
| 2013/0169238 A1 | 7/2013 | Rojeski |
| 2013/0189575 A1 | 7/2013 | Anguchamy et al. |
| 2013/0244862 A1 | 9/2013 | Ivanovici et al. |
| 2013/0295462 A1 | 11/2013 | Atanassova et al. |
| 2013/0337334 A1 | 12/2013 | Tao et al. |
| 2013/0344391 A1 | 12/2013 | Yushin et al. |
| 2014/0038042 A1 | 2/2014 | Rios et al. |
| 2014/0170482 A1 | 6/2014 | Park et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0162603 A1 | 6/2015 | Yushin et al. |
| 2015/0207148 A1 | 7/2015 | Kimura et al. |
| 2015/0238917 A1 | 8/2015 | Mulik et al. |
| 2015/0306570 A1 | 10/2015 | Mayes et al. |
| 2016/0039970 A1 | 2/2016 | Kron et al. |
| 2016/0043384 A1 | 2/2016 | Zhamu et al. |
| 2016/0104882 A1 | 4/2016 | Yushin et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0015559 A1 | 1/2017 | Costantino et al. |
| 2017/0152340 A1 | 6/2017 | Geramita et al. |
| 2017/0346084 A1 | 11/2017 | Sakshaug et al. |
| 2018/0097240 A1 | 4/2018 | Feaver et al. |
| 2018/0130609 A1 | 5/2018 | Feaver et al. |
| 2018/0294484 A1 | 10/2018 | Fredrick et al. |
| 2018/0331356 A1 | 11/2018 | Feaver et al. |
| 2019/0097222 A1 | 3/2019 | Feaver et al. |
| 2019/0103608 A1 | 4/2019 | Costantino et al. |
| 2019/0259546 A1 | 8/2019 | Kron et al. |
| 2019/0267622 A1 | 8/2019 | Sakshaug et al. |
| 2019/0280298 A1 | 9/2019 | Sakshaug et al. |

FOREIGN PATENT DOCUMENTS

| | | | |
|---|---|---|---|
| CN | 1762900 A | | 4/2006 |
| CN | 1986401 A | | 6/2007 |
| CN | 101194384 A | | 6/2008 |
| CN | 101318648 A | | 12/2008 |
| CN | 101604743 A | | 12/2009 |
| CN | 101969120 A | | 2/2011 |
| CN | 102482095 A | | 5/2012 |
| CN | 102820455 A | | 12/2012 |
| CN | 102834955 A | | 12/2012 |
| CN | 103094528 A | | 5/2013 |
| CN | 103746098 A | | 4/2014 |
| CN | 104108698 A | | 10/2014 |
| CN | 102509781 B | | 11/2015 |
| DE | 10 2010 049 249 A1 | | 4/2012 |
| EP | 0 649 815 A1 | | 4/1995 |
| EP | 0 861 804 A1 | | 9/1998 |
| EP | 1 049 116 A1 | | 11/2000 |
| EP | 1 052 716 A2 | | 11/2000 |
| EP | 1 115 130 A1 | | 7/2001 |
| EP | 1 248 307 A1 | | 10/2002 |
| EP | 1 514 859 A2 | | 3/2005 |
| EP | 2 117 068 A1 | | 11/2009 |
| EP | 2 983 186 A1 | | 2/2016 |
| JP | 2-300222 A | | 12/1990 |
| JP | 4-59806 A | | 2/1992 |
| JP | 4-139174 A | | 5/1992 |
| JP | 5-117493 A | | 5/1993 |
| JP | 5-156121 A | | 6/1993 |
| JP | 5-320955 A | | 12/1993 |
| JP | 8-59919 A | | 3/1996 |

(56) References Cited

FOREIGN PATENT DOCUMENTS

| | | | |
|---|---|---|---|
| JP | 8-112539 A | 5/1996 |
| JP | 9-63905 A | 3/1997 |
| JP | 9-275042 A | 10/1997 |
| JP | 9-328308 A | 12/1997 |
| JP | 7-232908 A | 4/1998 |
| JP | 10-297912 A | 11/1998 |
| JP | 2001-89119 A | 4/2001 |
| JP | 2001-278609 A | 10/2001 |
| JP | 2002-532869 A | 10/2002 |
| JP | 2004-67498 A | 3/2004 |
| JP | 2004-514637 A | 5/2004 |
| JP | 2004-203715 A | 7/2004 |
| JP | 2004-221332 A | 8/2004 |
| JP | 2004-315283 A | 11/2004 |
| JP | 2005-93984 A | 4/2005 |
| JP | 2005-132696 A | 5/2005 |
| JP | 2005-136397 A | 5/2005 |
| JP | 2005-187320 A | 7/2005 |
| JP | 2006-160597 A | 6/2006 |
| JP | 2006-248848 A | 9/2006 |
| JP | 2006-264993 A | 10/2006 |
| JP | 2007-115749 A | 5/2007 |
| JP | 2008-7387 A | 1/2008 |
| JP | 2008-94925 A | 4/2008 |
| JP | 2009-259803 A | 11/2009 |
| JP | 2012-121796 A | 6/2012 |
| KR | 10-2004-0080010 A | 9/2004 |
| WO | 95/01165 A1 | 1/1995 |
| WO | 98/30496 A1 | 7/1998 |
| WO | 98/55238 A1 | 12/1998 |
| WO | 02/39468 A2 | 5/2002 |
| WO | 2004/087285 A1 | 10/2004 |
| WO | 2004/099073 A2 | 11/2004 |
| WO | 2004/110930 A1 | 12/2004 |
| WO | 2005/043653 A1 | 5/2005 |
| WO | 2005/103490 A1 | 11/2005 |
| WO | 2007/061761 A1 | 5/2007 |
| WO | 2008/047700 A1 | 4/2008 |
| WO | 2008/113133 A1 | 9/2008 |
| WO | 2009/032104 A2 | 3/2009 |
| WO | 2010/032782 A1 | 3/2010 |
| WO | 2010/059749 A1 | 5/2010 |
| WO | 2010/138760 A2 | 12/2010 |
| WO | 2011/002536 A2 | 1/2011 |
| WO | 2011/003033 A1 | 1/2011 |
| WO | 2012/045002 A1 | 4/2012 |
| WO | 2012/071916 A1 | 6/2012 |
| WO | 2012/092210 A1 | 7/2012 |
| WO | 2013/120009 A1 | 8/2013 |
| WO | 2013/120011 A1 | 8/2013 |
| WO | 2014/201275 A2 | 12/2014 |
| WO | 2019/147836 A2 | 8/2019 |

OTHER PUBLICATIONS

Abraham et al., "A Polymer Electrolyte-Based Rechargeable Lithium/Oxygen Battery," *J. Electrochem. Soc.* 143(1):1-5, Jan. 1996.
Alcañiz-Monge et al., "Methane Storage in Activated Carbon Fibres," *Carbon* 35(2):291-297, 1997.
Anderegg, "Grading Aggregates: II—The Application of Mathematical Formulas to Mortars," *Industrial and Engineering Chemistry* 23(9): 1058-1064, 1931.
Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930, with translation of summary. (17 pages).
Babić et al., "Carbon cryogel as support of platinum nano-sized electrocatalyst for the hydrogen oxidation reaction," *Electrochimica Acta* 51:3820-3826, 2006.
Babić et al., "Characterization of carbon cryogel synthesized by sol-gel polycondensation and freeze-drying," *Carbon* 42:2617-2624, 2004.
Babić et al., "Characterization of carbon cryogels synthesized by sol-gel polycondensation," *J. Serb. Chem. Soc.* 70(1):21-31, 2005.
Barbieri et al., "Capacitance limits of high surface area activated carbons for double layer capacitors," *Carbon* 43:1303-1310, 2005.
Barton et al., "Tailored Porous Materials," *Chem. Mater.* 11:2633-2656, 1999.
Beattie et al., "High-Capacity Lithium-Air Cathodes," *J. Electrochem. Soc.* 156(1):A44-A47, 2009.
Besenhard, "Handbook of battery materials," Weinheim, Wiley-VCH, Weinheim, New York, 398-401, Dec. 31, 1999.
Bock et al., "Structural Investigation of Resorcinol Formaldehyde and Carbon Aerogels Using SAXS and BET," *Journal of Porous Materials* 4:287-294, 1997.
Buiel et al., "Li-insertion in hard carbon anode materials for Li-ion batteries," *Electrochimica Acta* 45:121-130, 1999.
Burchell et al., "Low Pressure Storage of Natural Gas for Vehicular Applications," *The Engineering Society for Advancing Mobility Land Sea Air and Space, Government/Industry Meeting*, Washington D.C., Jun. 19-21, 2000, 7 pages.
Butler et al., "Braking Performance Test Procedure for the Hybrid Vehicle Energy Storage Systems: Capacitor Test Results," Joint International Meeting of the Electrochemical Society, Abstract 684, Honolulu, HI, Oct. 3-8, 2004, 5 pages.
Cao et al., "Li-ion capacitors with carbon cathode and hard carbon/stabilized lithium metal powder anode electrodes," *Journal of Power Sources* 213:180-185, Apr. 2012.
Chang et al., "Carbon Materials Comprising Enhanced Electrochemical Properties," U.S. Appl. No. 14/988,625, filed Jan. 5, 2016, 112 pages.
Chmiola et al., "Anomalous Increase in Carbon Capacitance at Pore Sizes Less Than 1 Nanometer," *Science* 313:1760-1763, Sep. 22, 2006.
Constantino et al., "Carbon-Based Compositions With Highly Efficient Volumetric Gas Sorption," filed Nov. 5, 2014, U.S. Appl. No. 14/533,956, 90 pages.
Conway et al., "Partial Molal vols. Of Tetraalkylammonium Halides and Assignment of Individual Ionic Contributions," *Trans. Faraday Soc.* 62:2738-2749, 1966.
Costantino et al., "Enhanced Packing of Energy Storage Particles," U.S. Appl. No. 15/199,343, filed Jun. 30, 2016, 97 pages.
Czakkel et al., "Influence of drying on the morphology of resorcinol-formaldehyde-based carbon gels," *Microporous and Mesoporous Materials* 86:124-133, 2005.
Debart et al., "α-MnO2 Nanowires: A Catalyst for the O2 Electrode in Rechargeable Lithium Batteries," *Agnew. Chem. Int. Ed.* 47:4521-4524, 2008.
Ding et al., "How Conductivities and Viscosities of PC-DEC and PC-EC Solutions of LiBF4, LiPF6, LiBOB, Et4NBF4, and Et4NBF6 Differ and Why," *Journal of the Electrochemical Society* 151(12):A2007-A2015, 2004.
Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Fotouhi et al., "A Low Cost, Disposable Cable-Shaped Al-Air Battery for Portable Biosensors," *J. Micromech. Microeng.* 26:055011, 2016. (8 pages).
Furnas, "Grading Aggregates I—Mathematical Relations for Beds of Broken Solids of Maximum Density," *Industrial and Engineering Chemistry* 23(9):1052-1058, 1931.
Gao et al., "Nitrogen-rich graphene from small molecules as high performance anode material," *Nanotechnology* 25:415402, 2014, 8 pages.

(56) References Cited

OTHER PUBLICATIONS

Gouérec et al., "Preparation and Modification of Polyacrylonitrile Microcellular Foam Films for Use as Electrodes in Supercapacitors," *Journal of the Electrochemical Society* 148(1):A94-A101, 2001.

Hahn et al., "A dilatometric study of the voltage limitation of carbonaceous electrodes in aprotic EDLC type electrolytes by charge-induced strain," *Carbon* 44:2523-2533, 2006.

Hasegawa et al., "Preparation of carbon gel microspheres containing silicon powder for lithium ion battery anodes," *Carbon* 42:2573-2579, 2004.

Hirscher et al., "Are carbon nanostructures an efficient hydrogen storage medium?" *Journal of Alloys and Compounds* 356-357:433-437, 2003.

Hong et al., "Hydrogen evolution inhibition with diethylenetriamine modification of activated carbon for a lead-acid battery," *RSC Adv.* 4:33574-33577, 2014.

Hsieh et al., "Synthesis of mesoporous carbon composite and its electric double-layer formation behavior," *Microporous and Mesoporous Materials* 93:232-239, 2006.

Hu et al., "Effects of electrolytes and electrochemical pretreatments on the capacitive characteristics of activated carbon fabrics for supercapacitors," *Journal of Power Sources* 125:299-308, 2004.

Huang et al., "Nitrogen-containing mesoporous carbons prepared from melamine formaldehyde resins with $CaCl_2$ as a template," *J. Colloid Interface Sci.* 363(1):193-198, 2011.

Indo German Carbons Limited, "Activated Carbon," Apr. 2009, URL=http://www.igcl.com/php/activated_carbon.php, download date Nov. 29, 2018, 3 pages.

Inomata et al., "Natural gas storage in activated carbon pellets without a binder," *Carbon* 40:87-93, 2002.

Job et al., "Carbon aerogels, cryogels and xerogels: Influence of the drying method on the textural properties of porous carbon materials," *Carbon* 43:2481-2494, 2005.

Job et al., "Highly dispersed platinum catalysts prepared by impregnation of texture-tailored carbon xerogels," *Journal of Catalysis* 240:160-171, 2006.

Job et al., "Synthesis of transition metal-doped carbon xerogels by solubilization of metal salts in resorcinol-formaldehyde aqueous solution," *Carbon* 42:3217-3227, 2004.

Khomenko et al., "High-voltage asymmetric supercapacitors operating in aqueous electrolyte," *Appl. Phys. A* 82:567-573, 2006.

Kim et al., "Correlation between the capacitor performance and pore structure," *Tanso* 221:31-39, 2006.

Kim et al., "Adsorption of phenol and reactive dyes from aqueous solution on carbon cryogel microspheres with controlled porous structure," *Microporous and Mesoporous Materials* 96:191-196, 2006.

Kocklenberg et al., "Texture control of freeze-dried resorcinol-formaldehyde gels," *Journal of Non-Crystalline Solids* 225:8-13, 1998.

Konno et al., "Preparation of activated carbon having the structure derived from biomass by alkali activation with NaOH, and its application for electric double-layer capacitor," *Tanso* 231:2-7, 2008.

Kowalczyk et al., "Estimation of the pore-size distribution function from the nitrogen adsorption isotherm. Comparison of density functional theory and the method of Do and co-workers," *Carbon* 41:1113-1125, 2003.

Lozano-Castello et al., "Influence of pore structure and surface chemistry on electric double layer capacitance in non-aqueous electrolyte," *Carbon* 41:1765-1775, 2003.

Lozano-Castello et al., "Powdered Activated Carbons and Activated Carbon Fibers for Methane Storage: A Comparative Study," *Energy & Fuels* 16:1321-1328, 2002.

McEwen et al., "Nonaqueous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.

Miller, "Pulse Power Performance of Electrochemical Capacitors: Technical Status of Present Commercial Devices," Proceedings of the 8th International Seminar on Double Layer Capacitors and Similar Energy Storage Devices, Deerfield Beach, Florida, Dec. 7-9, 1998, 9 pages.

Naoi et al., "Second generation 'nanohybrid supercapacitor': Evolution of capacitive energy storage devices," *Energy Environ. Sci.* 5:9363-9373, 2012.

Nishihara et al., "Preparation of resorcinol—formaldehyde carbon cryogel microhoneycombs," *Carbon* 42:899-901, 2004.

Ogasawara et al., "Rechargeable LI2O2 Electrode for Lithium Batteries," *Journal American Chemical Society* 128(4):1390-1393, 2006.

Otowa et al., "Production and adsorption characteristics of MAXSORB: High-surface-area active carbon," *Gas Separation and Purification* 7(4):241-245, 1993.

Pääkkö, "Long and entangled native cellulose I nanofibers allow flexible aerogels and hierarchically porous templates for functionalities," *Soft Matter* 4:2492-2499, 2008.

Pekala et al., "Aerogels derived from multifunctional organic monomers," *Journal of Non-Crystalline Solids* 145:90-98, 1992.

Pekala et al., "Structure of Organic Aerogels. 1. Morphology and Scaling," *Macromolecules* 26:5487-5493, 1993.

Pekala, "Organic aerogels from the polycondensation of resorcinol with formaldehyde," *Journal of Materials Science* 24:3221-3227, 1989.

Perrin et al., "Methane Storage within Dry and Wet Active Carbons: A Comparative Study," *Energy & Fuels* 17:1283-1291, 2003.

Pimenta et al., "Studying disorder in graphite-based systems by Raman spectroscopy," *Phys. Chem. Chem. Phys.* 9:1276-1291, 2007.

Pojanavaraphan et al., "Prevulcanized natural rubber latex/clay aerogel nanocomposites," *European Polymer Journal* 44:1968-1977, 2008.

Qu et al., "Studies of activated carbons used in double-layer capacitors," *Journal of Power Sources* 74:99-107, 1998.

Ravikovitch et al., "Unified Approach to Pore Size Characterization of Microporous Carbonaceous Materials from N2, Ar, and CO2 Adsorption Isotherms," *Langmuir* 16:2311-2320, 2000.

Read, "Ether-Based Electrolytes for the Lithium/Oxygen Organic Electrolyte Battery," *J. Electrochem. Soc.* 153(1):A96-A100, 2006.

Read et al., "Oxygen Transport Properties of Organic Electrolytes and Performance of Lithium/Oxygen Battery," *J. Electrochem. Soc.* 150(10):A1351-A1356, 2003.

Read, "Characterization of the Lithium/Oxygen Organic Electrolyte Battery," *J. Electrochemical Soc.* 149(9):A1190-A1195, 2002.

Reichenauer et al., "Microporosity in carbon aerogels," *Journal of Non-Crystalline Solids* 225:210-214, 1998.

Salitra et al., "Carbon Electrodes for Double-Layer Capacitors I. Relations Between Ion and Pore Dimensions," *Journal of the Electrochemical Society* 147(7):2486-2493, 2000.

Setoyama et al., "Simulation Study on the Relationship Between a High Resolution αs-Plot and the Pore Size Distribution for Activated Carbon," *Carbon* 36(10):1459-1467, 1998.

Sigma Aldrich, "Triton X-100," Data Sheet, URL=https://www.sigmaaldrich.com/catalog/product/roche/11332481001?lang=en&region=US, download date Feb. 21, 2019.

Simon et al., "Materials for electrochemical capacitors," *Nature Materials* 7:845-854, Nov. 2008.

Sivakkumar et al., "Evaluation of Lithium-ion capacitors assembled with pre-lithiated graphite anode and activated carbon cathode," *Electrochimica Acta* 65:280-287, Jan. 2012.

Takeuchi et al., "Removal of single component chlorinated hydrocarbon vapor by activated carbon of very high surface area," *Separation and Purification Technology* 15:79-90, 1999.

Tamon et al., "Influence of freeze-drying conditions on the mesoporosity of organic gels as carbon precursors," *Carbon* 38:1099-1105, 2000.

Tamon et al., "Preparation of mesoporous carbon by freeze drying," *Carbon* 37:2049-2055, 1999.

Thompkins et al., "Composite Carbon Materials Comprising Lithium Alloying Electrochemical Modifiers," U.S. Appl. No. 14/084,469, filed Nov. 19, 2013. (424 App).

(56) References Cited

OTHER PUBLICATIONS

Tonanon et al., "Influence of surfactants on porous properties of carbon cryogels prepared by sol-gel polycondensation of resorcinol and formaldehyde," *Carbon* 41:2981-2990, 2003.

Toyo Tanso Carbon Products, "Special Graphite and Compound Material Products," Toyo Tanso Co., Ltd. Catalog published 2008.

Toyo Tanso, "Graphite Applications," Toyo Tanso Co., Ltd. Catalog published 1998. (Machine Translation Attached).

Toyo Tanso, "Isotropic Graphite Engineering Data," Toyo Tanso Co., Ltd. Catalog published 1994.

Toyo Tanso, "Isotropic Graphite Technical Data," Toyo Tanso Co., Ltd. Catalog published 1997.

Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.

WebElements, "Lead: the essentials," attached as a PDF showing the webpage availability date as of Aug. 14, 2009 (via the Wayback Machine), web URL is http://www.webelements.com/lead/, pp. 1-3.

Wei et al., "A novel electrode material for electric double-layer capacitors," *Journal of Power Sources* 141:386-391, 2005.

Williford et al., "Air electrode design for sustained high power operation of Li/air batteries," *Journal of Power Sources* 194:1164-1170, 2009.

Wu et al., "Fabrication and nano-structure control of carbon aerogels via a microemulsion-templated sol-gel polymerization method," *Carbon* 44:675-681, 2006.

Xie et al., "Pore size control of Pitch-based activated carbon fibers by pyrolytic deposition of propylene," *Applied Surface Science* 250:152-160, 2005.

Xu et al., "Optimization of Nonaqueous Electrolytes for Primary Lithium/Air Batteries Operated in Ambient Environment," *Journal of the Electrochemical Society* 156(10):A773-A779, 2009.

Xu et al., "Synthesis of mesoporous carbon and its adsorption property to biomolecules," *Microporous and Mesoporous Materials* 115:461-468, 2008.

Yamamoto et al., "Porous properties of carbon gel microspheres as adsorbents for gas separation," *Carbon* 42:1671-1676, 2004.

Yamamoto et al., "Control of mesoporosity of carbon gels prepared by sol-gel polycondensation and freeze drying," *Journal of Non-Crystalline Solids* 288:46-55, 2001.

Yamamoto et al., "Preparation and characterization of carbon cryogel microspheres," *Carbon* 40:1345-1351, 2002.

Yang et al., "Preparation of highly microporous and mesoporous carbon from the mesophase pitch and its carbon foams with KOH," *Carbon* 42:1872-1875, 2004.

Zhang et al., "Discharge characteristic of non-aqueous electrolyte Li/O2 battery," *Journal of Power Sources* 195:1235-1240, 2010.

Zhao et al., "Highly-Ordered Mesoporous Carbon Nitride with Ultrahigh Surface Area and Pore Volume as a Superior Dehydrogenation Catalyst," *Chem. Mater.* 26(10):3151-3161, 2014.

FIG. 6.5
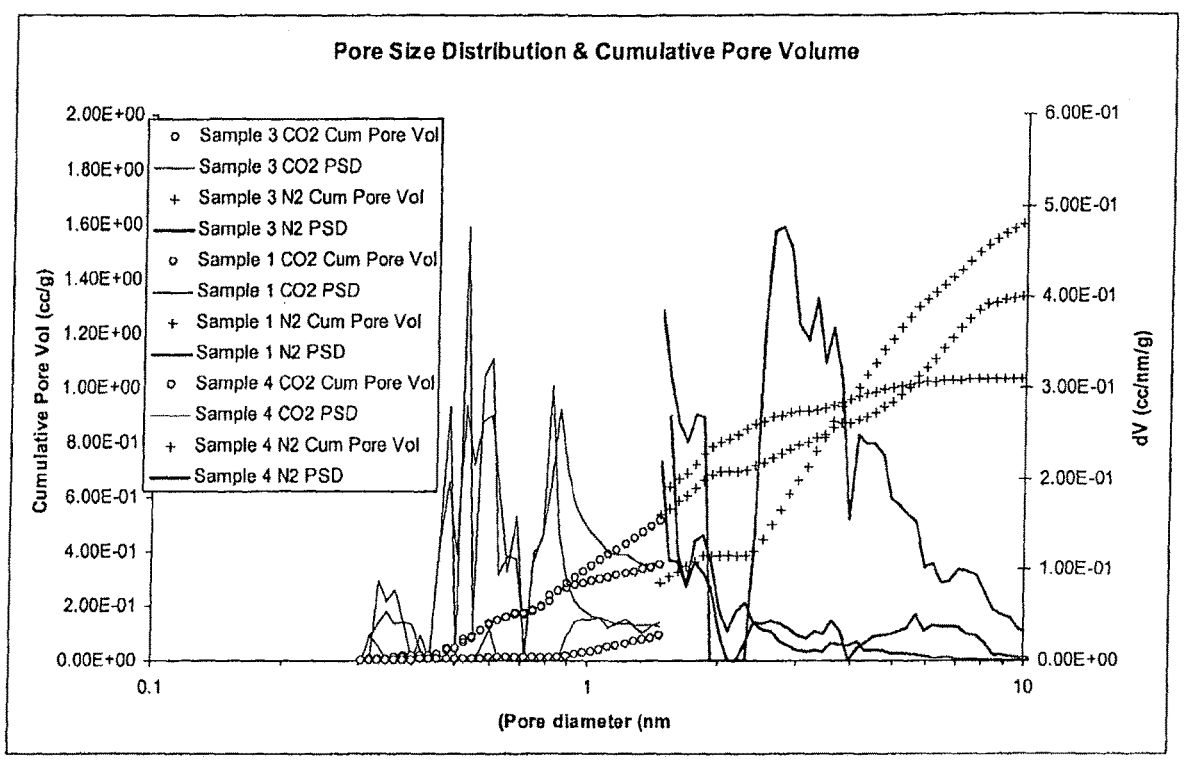

FIG. 7A-B
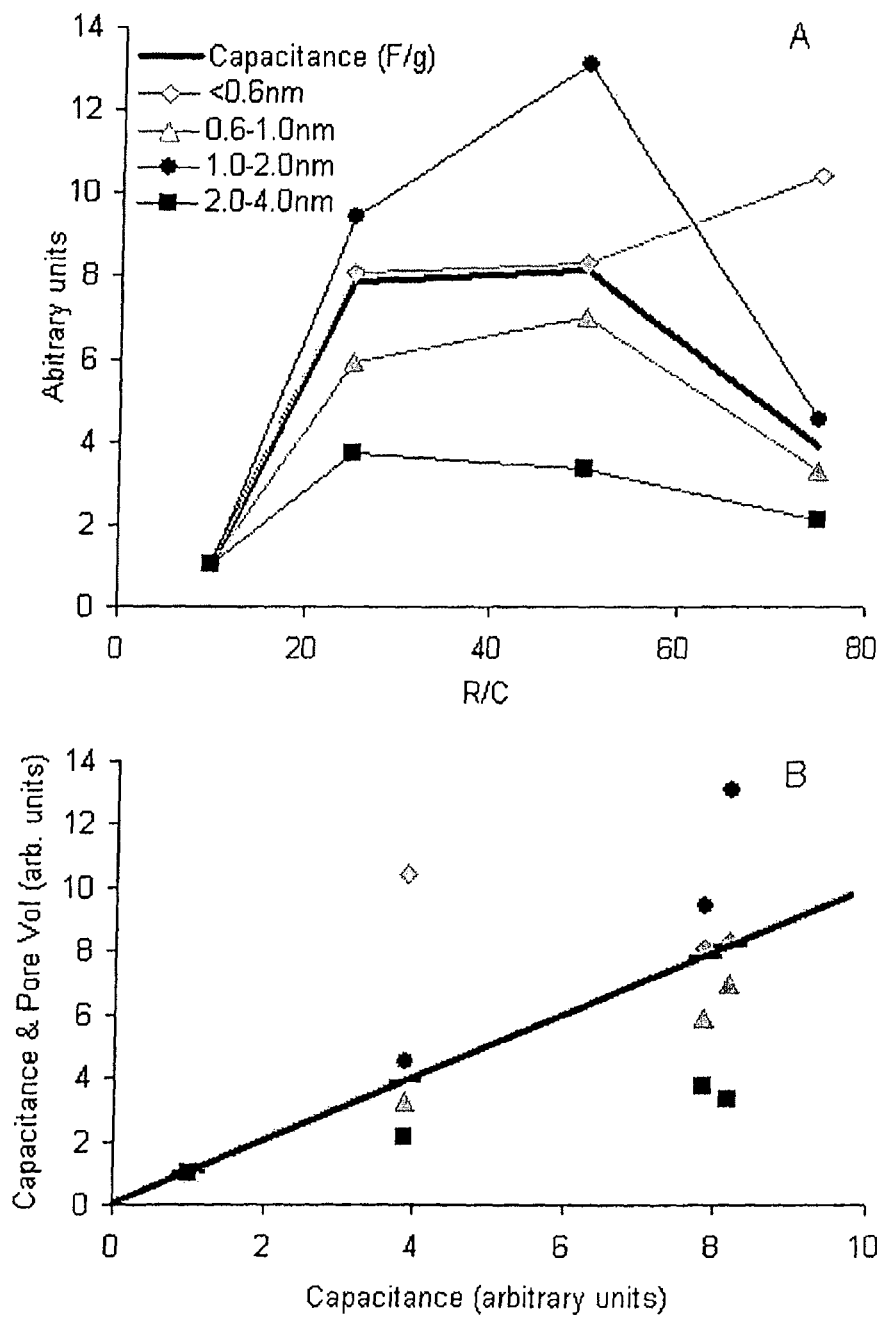

C

FIG. 8A & B
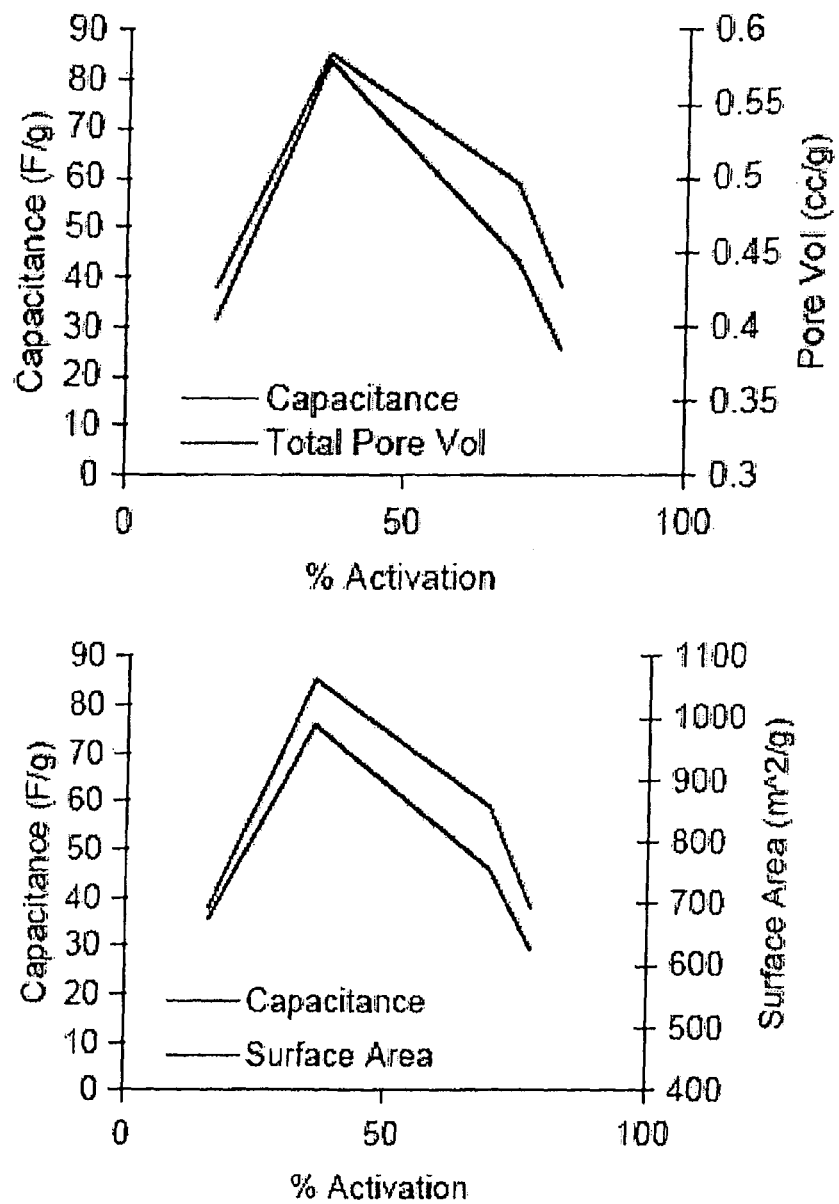

ELECTRIC DOUBLE LAYER CAPACITANCE DEVICE

DETAILED DESCRIPTION

As hybrid vehicles become more ubiquitous, the need for enhancements in performance of electrical storage devices such as supercapacitors and batteries continues to grow. Electric Double Layer Capacitors (EDLCs) comprise one way to fill the gap between the high energy content of traditional electrochemical batteries or fuel cells and high power dielectric capacitors (see FIG. 3). However, current electrode materials in use generally result in an EDLC super capacitor that is a compromise both in terms of power and energy output. The new activated carbon cryogel electrode materials disclosed herein may bring super capacitors to a level that competes with the power of dielectric capacitors and the energy content of fuel cells or batteries. EDLCs store charge on the surface of the electrode material by adsorbing electrolyte ions in a charged double layer. For this reason, attention should be paid the surface area of the electrode as well as the accessibility of the pores and conductivity of the system once electrolyte is added. Examples of the activated carbon cryogel based electrodes presented herein display the ability to tune these parameters using simple sol-gel processing variables as well as using more standard modifications via pyrolysis and activation. These activated carbon cryogel electrodes can be prepared with surface areas higher than 2500 $m^2/g$ with tunable micropore size distribution that results in significant capacitance and power.

The present application is directed to electric double layer capacitance (EDLC) devices. In one aspect, the present application is directed to an electrode comprising an activated carbon cryogel having a tunable pore structure wherein: the surface area is at least 1500 $m^2/g$ as determined by nitrogen sorption at 77K and BET analysis; and the pore structure comprises a pore volume ranging from about 0.01 cc/g to about 0.25 cc/g for pores having a pore diameter of 0.6 to 1.0 nm. In another aspect, the present application is directed to an Electric Double Layer Capacitor (EDLC) device comprising an activated cryogel.

The embodiments of the invention and the various features and advantageous details thereof are explained more fully with reference to the non-limiting embodiments and examples that are described and/or illustrated in the accompanying drawings and detailed in the following description. It should be noted that the features of one embodiment may be employed with other embodiments as the skilled artisan would recognize, even if not explicitly stated herein. The examples used herein are intended merely to facilitate an understanding of ways in which the invention may be practiced and to further enable those of skill in the art to practice the embodiments of the present application. Accordingly, the examples and embodiments herein should not be construed as limiting the scope of the application, which is defined solely by the appended claims.

BRIEF DESCRIPTION OF THE FIGURES

FIG. 6.5: Pore size distribution and cumulative pore volume from 0.35 nm-1.5 nm (using $CO_2$ adsorption) and from 1.5. nm-10 nm (using $N_2$ adsorption).

FIG. 7A is a graph of R/C vs. normalized values for pore size distribution in 4 ranges (<0.6 nm, 0.6-1.0 nm, 1.0-2.0 nm, 2.0-4.0 nm) as compared to capacitance. All values are multiplied by a constant such that the value at R/C=10 is forced to 1.00.

FIG. 7B is a graph of the same data as in FIG. 7A with Pore volume vs. Capacitance and capacitance vs. capacitance as a baseline.

FIG. 8A is a graph of % Activation vs. capacitance (F/g) and pore volume (cc/g) for four samples activated to different levels.

FIG. 8B is a graph based on the same four samples with % activation plotted against capacitance and surface area ($m^2/g$).

Voltage starts at 1.25 V and ends at 2.5 V during the charge. As charge times are decreased (higher charge rates), less of the energy is stored.

Figure 18:
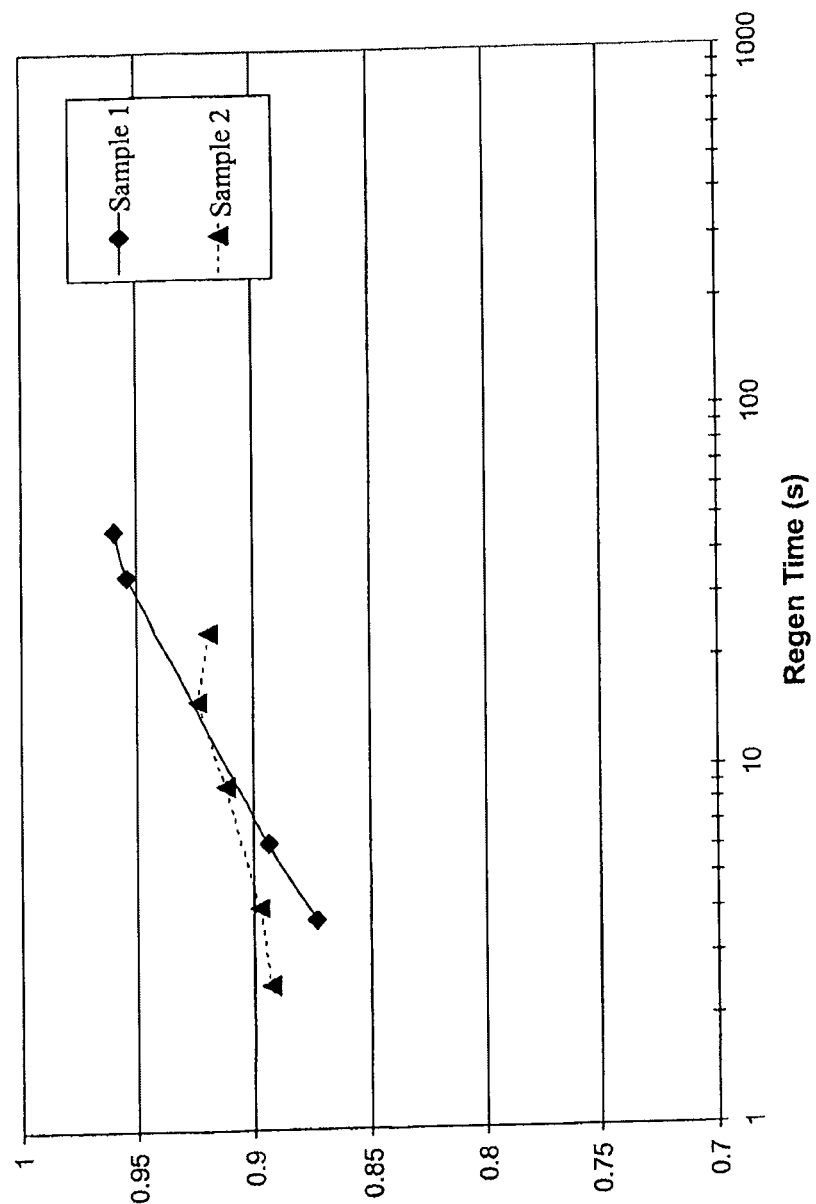

FIG. 18 is a ratio of energy stored to total available energy to store a different charge times (energy acceptance efficiency).

Unless specifically noted otherwise herein, the definitions of the terms used are standard definitions used in the art of organic and peptide synthesis and pharmaceutical sciences.

As used herein the term "electrode" refers to the porous material on which electrolyte ions are absorbed in order to form the double layer.

As used herein "synthetic polymer" refers to a polymer material derived from synthetic precursors or monomers.

As used herein the phrase "carbon cryogel," refers to an open porous structure derived from a polymer cryogel or other cryogel comprised of an organic material capable of yielding carbon, which is subsequently carbonized or pyrolyzed.

As used herein the term "sol" refers to a colloidal suspension of precursor particles and the term "gel" refers to a wet three-dimensional porous network obtained by condensation of the precursor particles.

As used herein the term "binder" refers to a material capable of holding individual particles of carbon together such that after mixing a binder and carbon together the resulting mixture can be formed into sheets, pellets or disks. Non-exclusive examples include fluoropolymers, such as, for example, PTFE (polytetrafluoroethylene, Teflon); PFA (perfluoroalkoxy polymer resin, also known as Teflon); FEP (fluorinated ethylene-propylene, also known as Teflon); ETFE (polyethylenetetrafluoroethylene, sold as Tefzel and Fluon); PVF (polyvinylfluoride, sold as Tedlar); ECTFE (polyethylenechlorotrifluoroethylene, sold as Halar); PVDF (polyvinylidene fluoride, sold as Kynar); PCTFE (polychlorotrifluoroethylene, sold as Kel-F and CTFE) and trifluoroethanol.

As used herein the term "inert" refers to a material that is not active in the electrolyte, that is it does not absorb a significant amount of ions or change chemically, e.g. degrade.

As used herein the term "porous separator" refers to a material that is capable of insulating the opposite electrodes from each other electrically but has open pores so that electrolyte can pass from one electrode to the other.

As used herein the term "conductive" refers to the ability of a material to conduct electrons through transmission of loosely held valence electrons.

As used herein the term "current collector" refers to a highly conductive material which is capable of conducting electrons much more easily than the active electrode material. Current collectors can comprise conductive polymers, metals, such as, for example, treated aluminum, stainless steel, titanium, platinum, gold, copper, nickel, or other such metals or combinations of metals and/or polymers that are not easily corroded by the electrolyte.

As used herein the term "electrical contact" refers to physical contact sufficient to conduct available current from one material to the next.

The term "pore" refers to an opening or depression in the surface, or a tunnel in a carbon based structure, i.e. a cryogel. A pore can be a single tunnel or connected to other tunnels in a continuous network throughout the structure.

As used herein the term "pore structure" refers to the layout of the surface of the internal pores within the activated carbon cryogel. Generally the pore structure of activated carbon cryogels comprises of micropores and mesopores. The term "mesopore" refers to pores having a diameter greater than 2 nanometers. The term "micropore" refers to pores having a diameter less than 2 nanometers.

As used herein the terms "activate," "activation," and "activated" each refer to any of the various processes by which the pore structure of a cryogel is enhanced. Generally, in such processes the microporosity inherent in the cryogel is exposed to the surface. Activation can be accomplished by use of, for example, steam, $CO_2$ or chemicals. Activation in the presence of $CO_2(g)$ is specifically exemplified herein, but other activation methods are well-known to one of skill in the art. For example, chemical activation can employ activation aids, such as phosphoric acid, potassium hydroxide, sodium hydroxide, sodium carbonate, potassium carbonate, and zinc chloride.

The term "surface area" refers to the total surface area of a substance measurable by the BET technique.

As used herein "connected" when used in reference to mesopores and micropores refers to the spatial orientation of such pores such that electrolyte ions can pass freely from one pore to the next. As used herein "effective length" refers to the portion of the length of the pore that is of sufficient diameter such that it is available to accept salt ions from the electrolyte.

As used herein the term "synthetic polymer precursor material" refers to compounds used in the preparation of a synthetic polymer. Examples of precursor material that can be used in the preparation disclosed herein include, but are not limited to aldehydes, such as for example, methanal (formaldehyde); ethanal (acetaldehyde); propanal (propionaldehyde); butanal (butyraldehyde); glucose; benzaldehyde; cinnamaldehyde, as well as phenolic compounds that can be react with formaldehyde or other aldehydes in the presence of a basic catalyst to provide a polymeric gel (crosslinked gel). Suitable phenolic compounds include a polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used.

As used herein the term "tunable" refers to an ability to adjust the pore structure so that any one of pore size, pore volume, surface area, density, pore size distribution, and pore length of either or both of the mesopores and micropores are adjusted up or down. Tuning of the pore structure of the activated carbon cryogel can be accomplished a number of ways, including but not limited to varying the parameters of producing a tunable synthetic polymer precursor material; varying the parameters of freeze-drying the tunable synthetic polymer precursor material; varying the parameters of carbonizing the dried cryogel; and varying the parameters of activating the carbon cryogel.

As used herein, the terms "carbonizing" and "carbonization" each refer to the process of heating a carbon-containing substance in an inert atmosphere or in a vacuum so that the targeted material collected at the end of the process is primarily carbon.

As used herein "regen-capture energy captured" refers to the quantity of energy a device captures during charging; "regen-capture energy stored" refers to the fraction of the captured energy that is stored and then available to accelerate a vehicle when it proceeds after the stop.

As used herein "regen energy acceptance efficiency" refers to the ratio of energy that can be potentially stored to the energy that is actually stored.

As used herein in reference to the regen capture test, "regen time" refers to the time available to the EDLC device to charge. A non-limiting example of the charge includes, for example, 1.25V to 2.5V.

As used herein, "dwell temperature" refers to the temperature of the furnace during the portion of a process which is reserved for neither heating nor cooling, but maintaining a relatively constant temperature. So, for example, the carbonization dwell temperature refers to the relatively constant temperature of the furnace during carbonization and the activation dwell temperature refers to the relatively constant temperature of the furnace during activation. Generally the carbonization dwell temperature ranges from about 650° C. to 1800° C., alternately from about 800° C. to about 900° C. Generally the activation dwell temperature ranges from about 800° C. to about 1300° C. Alternately, the dwell temperature ranges from about 900° C. to about 1050° C.

Examples of an electrolyte appropriate for use in the devices of the present application include but are not limited to propylene carbonate, ethylene carbonate, butylene carbonate, dimethyl carbonate, methyl ethyl carbonate, diethyl carbonate, sulfolane, methylsulfolane and acetonitrile. Such solvents are generally mixed with solute, including, tetralkylammonium salts such as TEATFB (tetraethylammonium tetrafluoroborate); MTEATFB (methyltriethylammonium tetrafluoroborate); EMITFB (1-ethyl-3-methylimidazolium tetrafluoroborate) or triethylammonium based salts. Further the electrolyte can be a water based acid or base electrolyte such as mild sulfuric acid or potassium hydroxide.

Examples of catalyst useful in preparation of the activated carbon cryogel include but are not limited to sodium carbonate, ammonia, and sodium hydroxide. Generally, the catalyst can be any compound that facilitates the polymerization of the sol to form a sol-gel. In the case of the reaction between resorcinol and formaldehyde, sodium carbonate is usually employed. Generally such catalysts are used in the range of molar ratios of 10:1 to 2000:1 resorcinol:catalyst.

Examples of solvent useful in the preparation of the activated carbon cryogel comprising the devices of the present application include but are not limited to water or alcohol such as, for example, ethanol, t-butanol, methanol or mixtures of these, optionally further with water.

Examples of drying the tunable synthetic polymer precursor material include, but are not limited to freeze drying, air drying, or supercritical drying. The parameters for freeze drying, air drying, and supercritical drying are known to those of skill in the art.

The present application provides the following embodiments, aspects and variations:

One aspect of the present application is an electrode comprising an activated carbon cryogel having a tunable pore structure wherein: the surface area of the pore structure is at least 1500 m²/g as determined by nitrogen sorption at 77K and BET analysis; and the pore structure comprises a pore volume ranging from about 0.01 cc/g to about 0.25 cc/g for pores having a pore diameter of 0.6 to 1.0 nm. The carbon cryogel have a surface area and pores and pore structures. In one embodiment, the specific capacitance of the electrode is at least 75 F/g and the specific power of the electrode is at least 10 W/g when each of the specific capacitance and specific power is measured in a electric double layer capacitor device comprising an electrolyte comprising propylene carbonate. In another embodiment the electrode is a component in a supercapacitor, an electric double layer capacitor, an ultracapacitor, or a pseudo capacitor.

One aspect of the present application is an Electric Double Layer Capacitor (EDLC) device comprising a) a positive electrode and a negative electrode wherein each of the positive and the negative electrodes comprise an activated carbon cryogel having a tunable pore structure; b) an inert porous separator; c) an electrolyte; wherein the positive electrode and the negative electrode are separated by the inert porous separator; and the specific capacitance of each of the positive and negative electrodes is independently at least 75 F/g and the specific power of each of the positive and negative electrodes is independently at least 10 W/g. In one embodiment, each of the specific capacitance and the specific power is measured in the device comprising an electrolyte comprising equal volumes of propylene carbonate and dimethylcarbonate and further comprising about 1.0 M tetraethylammonium-tetrafluoroborate. In one embodiment, the specific capacitance of each of the positive and negative electrodes independently ranges from about 75 F/g to about 150 F/g; alternately, the specific capacitance of each of the positive and negative electrodes independently ranges from about 90 F/g to about 130 F/g. In another embodiment, the specific capacitance of each of the positive and negative electrodes independently ranges from about 100 F/g to about 130 F/g. In one variation, the specific capacitance of each of the positive and negative electrodes is at least about 75 F/g or about 80 F/g or about 85 F/g or about 80 F/g. In another variation, the specific capacitance of each of the positive and negative electrodes is no more than about 150 F/g, no more than about 145 F/g, no more than about 140 F/g, no more than about 135 F/g, or no more than about 130 F/g. In one variation of any of the aspects or embodiments disclosed herein, the specific capacitance of the positive electrode is equal to the specific capacitance of the negative electrode; alternately, the specific capacitance of the positive electrode is not equal to the specific capacitance of the negative electrode.

In another embodiment of any of the aspects disclosed herein the specific power of each of the positive and negative electrodes independently ranges from about 10 W/g to about 50 W/g, alternately, the specific power of each of the positive and negative electrodes independently ranges from about 25 W/g to about 35 W/g. In another embodiment of any of the aspects disclosed herein, the specific energy of each of the positive and negative electrodes independently is at least about 25 J/g; alternately, the specific energy of each of the positive and negative electrodes independently ranges from about 25 J/g to about 50 J/g. In another embodiment, the specific energy of each of the positive and negative electrodes independently ranges from about 38 J/g to about 45 J/g. In one variation, the specific power of each of the positive and negative electrodes independently is at least about 10 W/g, or 15 W/g or 20 W/g or 25 W/g. In another variation, the specific power of each of the positive and negative electrodes independently is no more than about 50 W/g, or 45 W/g or 40 W/g or 35 W/g.

In another embodiment of any of the aspects disclosed herein, the regen-capture energy stored by an EDLC device ranges from about 0.040 to about 0.055 kJ/g for a regen time of about 2.5 seconds. In yet another embodiment, the regen-capture energy stored by the device ranges from about 0.065 to about 0.075 kJ/g for a regen time of about 72 seconds. Alternately, the regen-capture energy stored by an EDLC device is about 0.048 kJ/g for a regen time of about 2.5 seconds and about 0.068 kJ/g for a regen time of about 72 seconds.

In another embodiment of any of the aspects disclosed herein, the regen-capture energy captured by an EDLC device ranges from about 0.050 to about 0.065 kJ/g for a regen time of about 2.5 seconds. In yet another embodiment, the regen-capture energy captured by the device ranges from about 0.070 to about 0.075 kJ/g for a regen time of about 72 seconds. Alternately, the regen-capture energy captured by the device is about 0.054 kJ/g for a regen time of about 2.5 seconds and about 0.072 kJ/g for a regen time of about 72 seconds.

In another embodiment of any of the aspects disclosed herein, the regen energy acceptance efficiency of an EDLC device ranges from about 0.85 to about 0.95 at 2.5 seconds. In yet another embodiment, the regen energy acceptance efficiency of the device ranges from about 0.95 to about 0.99 at 47 seconds. Alternately, the regen energy acceptance efficiency of the device is about 0.89 at 2.5 seconds and about 0.96 at 47 seconds.

In another embodiment of any of the aspects disclosed herein, the activated carbon cryogel has surface area greater than about 1500 $m^2/g$ as determined by nitrogen sorption at 77K and BET analysis. Alternately, the activated carbon cryogel has surface area greater than about 1800, or greater than about 2000 $m^2/g$, or greater than about 2250 $m^2/g$ or greater than about 2500 $m^2/g$ or greater than about 2750 $m^2/g$ as determined by nitrogen sorption at 77K and BET analysis.

In another embodiment of any of the aspects disclosed herein, the EDLC device further comprises a binder. In one embodiment, the binder is selected from the group of fluoropolymers, such as polytetrafluoroethylene.

In another embodiment of any of the aspects disclosed herein, the electrolyte of the EDLC device is an aqueous or organic liquid electrolyte. In one variation, the electrolyte comprises acetonitrile. In another variation, the electrolyte is aqueous. In yet another variation, the electrolyte comprises an ammonium salt. In still another variation, the electrolyte comprises equal volumes of propylene carbonate and dimethylcarbonate and further comprises about 1.0 M tetraethylammonium-tetrafluoroborate. In yet another variation, the electrolyte is a solid state electrolyte.

In another embodiment of any of the aspects disclosed herein, the activated carbon cryogel is prepared according to a method comprising:
 a) combining in a first solvent a catalyst with a first monomeric polymer ingredient and a second monomeric polymer ingredient to yield a sol;
 b) gelling the sol by heating at a gelling temperature sufficient to yield a tunable synthetic polymer precursor material;
 c) freeze-drying the tunable synthetic polymer precursor material to yield a dried cryogel; and
 d) heating the dried cryogel in the presence of an inert gas or in a vacuum at a carbonization dwell temperature sufficient to carbonize the dried cryogel.
 e) heating the carbonized cryogel at an activation dwell temperature sufficient to activate the carbonized cryogel.

In one embodiment, the preparation of the activated carbon cryogel further comprises washing the tunable synthetic polymer precursor material with a second solvent to provide a solvent-exchanged tunable synthetic polymer precursor material. In one variation, the second solvent is an alcohol. In another embodiment, the second solvent is t-butanol.

In one embodiment, the activation of the carbonized cryogel is accomplished by any one of:
 i) heating the carbonized cryogel at an activation dwell temperature in the presence of carbon dioxide;
 ii) heating the carbonized cryogel at an activation dwell temperature in the presence of steam;
 iii) heating the carbonized cryogel at an activation dwell temperature in the presence of an activating aid.

In one variation, activation of the carbonized cryogel comprises heating the carbonized cryogel at an activation dwell temperature in the presence of carbon dioxide.

In another embodiment of any of the aspects disclosed herein, the tunable pore structure of the activated carbon cryogel is tuned by any one of: i) changing the catalyst; ii) changing the amount of catalyst; iii) changing the solvent used in step (a); iv) changing the amount of solvent; v) changing the first and/or second monomeric polymer ingredients; and vi) changing the relative amount of the first and/or second monomeric polymer ingredients. Such changes could thus lead to changes in the ratio of the first to second monomeric polymer ingredients, changes in the ratio of the first monomeric polymer ingredient to catalyst; changes in the ratio of the first monomeric polymer ingredient to solvent.

In one variation, the tunable pore structure of the activated carbon cryogel is tuned by any one of: i) changing the length of time of the freeze drying; ii) changing the pressure of the freeze drying; and iii) changing the temperature of the freeze drying.

In another variation, the tunable pore structure of the activated carbon cryogel is tuned by any one of: i) changing the dwell temperature at which the dried cryogel is carbonized; ii) changing the rate of heating to the carbonization dwell temperature; iii) changing the amount of time the dried cryogel is held at the carbonization dwell temperature; iv) using a different flow rate of gas during carbonization; v) using a different pressure of gas during carbonization; vi) using a different gas during carbonization; and vii) using a vacuum during carbonization.

In yet another variation, the tunable pore structure of the activated carbon cryogel is tuned by any one of: i) changing the dwell temperature at which the carbonized cryogel is activated; ii) changing the rate of heating to the activation dwell temperature; iii) changing the amount of time the dried cryogel is held at the activation dwell temperature; iv) using a different flow rate of gas during activation; v) using a different pressure of gas during activation; and vi) using a different gas during activation.

In one variation of any of the embodiments or aspects disclosed herein, the tunable pore structure of the activated cryogel has a pore volume ranging from about 0.01 cc/g to about 0.15 cc/g for pores having a diameter less than about 0.6 nm; alternately the tunable pore structure of the activated cryogel has a pore volume of about 0.12 cc/g for pores having a diameter less than about 0.6 nm. In another variation, the tunable pore structure has a pore volume ranging from about 0.01 cc/g to about 0.25 cc/g for pores having a diameter between about 0.6 nm and about 1.0 nm; alternately the tunable pore structure has a pore volume of about 0.19 cc/g for pores having a diameter between about 0.6 nm and about 1.0 nm. In yet another variation, the tunable pore structure has a pore volume ranging from about 0.30 cc/g to about 0.70 cc/g for pores having diameter between about 1.0 nm and about 2.0 nm; alternately the tunable pore structure has a pore volume of about 0.50 cc/g for pores having diameter between about 1.0 nm and about 2.0 nm. In another variation, the tunable pore structure has a pore volume ranging from about 0.15 cc/g to about 0.70 cc/g for pores having diameter between about 2.0 nm and about 4.0 nm; alternately the tunable pore structure has a pore volume of about 0.57 cc/g for pores having diameter between about 2.0 nm and about 4.0 nm. In yet a further variation, the tunable pore structure has a pore volume ranging from about 0.06 cc/g to about 0.50 cc/g for pores having diameter between about 4.0 nm and about 6.0 nm; alternatively, the tunable pore structure has a pore volume of about 0.37 cc/g for pores having diameter between about 4.0 nm and about 6.0 nm. In still a further variation, the tunable pore structure has a pore volume ranging from about 0.01 cc/g to about 0.30 cc/g for pores having diameter between about 6.0 nm and about 8.0 nm; alternately the tunable pore structure has a pore volume of about 0.21 cc/g for pores having diameter between about 6.0 nm and about 8.0 nm.

In one variation of any of the embodiments or aspects disclosed herein, the tunable pore structure has a pore volume ranging from about 0.01 cc/g to about 0.15 cc/g for pores having a diameter less than about 0.6 nm; a pore volume ranging from about 0.01 cc/g to about 0.25 cc/g for pores having a diameter between about 0.6 nm and about 1.0 nm; a pore volume ranging from about 0.30 cc/g to about 0.70 cc/g for pores having diameter between about 1.0 nm and about 2.0 nm; a pore volume ranging from about 0.15 cc/g to about 0.70 cc/g for pores having diameter between about 2.0 nm and about 4.0 nm; a pore volume ranging from about 0.06 cc/g to about 0.50 cc/g for pores having diameter between about 4.0 nm and about 6.0 nm; and a pore volume ranging from about 0.01 cc/g to about 0.30 cc/g for pores having diameter between about 6.0 nm and about 8.0 nm.

In another variation of any of the embodiments or aspects disclosed herein, the tunable pore structure has a pore volume of about 0.12 cc/g for pores having diameter less than about 0.6 nm; a pore volume of about 0.19 cc/g for pores having diameter between about 0.6 nm and about 1.0 nm; a pore volume of about 0.35 cc/g for pores having diameter between about 1.0 nm and about 2.0 nm; a pore volume of about 0.19 cc/g for pores having diameter between about 2.0 nm and about 4.0 nm; a pore volume of about 0.20 cc/g for pores having diameter between about 4.0 nm and about 6.0 nm; and a pore volume of about 0.20 cc/g for pores having diameter between about 6.0 nm and about 8.0 nm.

In one embodiment of any of the aspects disclosed herein, the tunable pore structure of the activated cryogel comprises micropores having an effective length of less than about 10 nm as determined by TEM measurements. Alternately, it comprises micropores having an effective length of less than about 5 nm as determined by TEM measurements.

In one embodiment of any of the aspects disclosed herein, the tunable pore structure of the activated cryogel comprises mesopores having a diameter ranging from about 2.0 to about 10.0 nm as determined from $N_2$ sorption derived DFT. The pore diameters disclosed herein in any embodiment or aspect can also be determined from $N_2$ and $CO_2$ sorption derived DFT. Alternately, the tunable pore structure comprises mesopores having a diameter ranging from about 2.0 to about 4.0 nm as determined from $N_2$ sorption derived DFT or it comprises mesopores having a diameter ranging from about 3.0 to about 4.0 nm as determined from $N_2$ sorption derived DFT. In another embodiment, the tunable pore structure of the activated cryogel comprises mesopores having a diameter ranging from about 4.0 to about 5.0 nm as determined from $N_2$ sorption derived DFT.

In one embodiment of any of the aspects disclosed herein, the tunable pore structure of the activated cryogel comprises micropores having a diameter ranging from about 0.3 nm to about 2.0 nm as determined from $CO_2$ sorption derived DFT. Alternately, the tunable pore structure comprises micropores having a diameter ranging from about 0.7 to about 1.5 nm as determined from $CO_2$ sorption derived DFT. In another embodiment, the tunable pore structure comprises micropores having a diameter ranging from about 0.7 to about 1.0 nm as determined from $CO_2$ sorption derived DFT or it comprises micropores having a diameter ranging from about 0.6 to about 1.0 nm as determined from $CO_2$ sorption derived DFT.

One aspect of the present invention is an electric double layer capacitor (EDLC) device comprising: a) a positive electrode and a negative electrode wherein each of the positive and second electrode comprises an activated carbon cryogel and polytetrafluoroethylene; b) an inert porous separator comprising polypropylene or polyethylene; c) a first and a second current collector each comprising a non-corrosive metal; and d) an electrolyte comprising equal volumes of propylene carbonate and dimethylcarbonate and further comprising about 1.0 M tetraethylammonium-tetrafluoroborate; wherein the positive and negative electrodes are separated by the porous separator and each is in contact with one current collector; and the specific capacitance of each of the positive and negative electrodes as measured in the device is independently at least 75 F/g and the specific power of each of the positive and negative electrodes as measured using the device independently is at least 10 W/g.

In another embodiment, the activated carbon cryogel of the EDLC device is prepared according to a method comprising: a) combining in a solvent a catalyst with resorcinol and formaldehyde to yield a sol; b) gelling the sol by heating at a gelling temperature sufficient to yield a sol gel; c) freeze-drying the sol gel to yield a dried cryogel; and d) heating the dried cryogel in the presence of an inert gas at a carbonization dwell temperature sufficient to carbonize the dried cryogel; e) heating the carbonized cryogel at an activation dwell temperature sufficient to activate the carbonized cryogel.

One aspect of the present invention is a method of manufacturing an electrode comprising activated carbon cryogel comprising: a) carbonizing a cryogel; b) activating a carbonized cryogel; and c) combining an activated carbon cryogel with a fluoropolymer.

Another aspect of the present invention is a method of tuning the pore structure of an activated carbon cryogel of an electrode comprising changing at least one parameter chosen from: i) changing the catalyst used in preparation of the sol; ii) changing the amount of catalyst used in preparation of the sol; iii) changing the solvent used in preparation of the sol; iv) changing the amount of solvent used in preparation of the sol; v) changing the first and/or second monomeric polymer ingredients used in preparation of the sol; and vi) changing the relative amount of the first and/or second monomeric polymer ingredients used in preparation of the sol.

Another aspect of the present invention is a method of tuning the pore structure of an activated carbon cryogel of an electrode comprising changing at least one parameter chosen from: i) the dwell temperature at which the dried cryogel is carbonized; ii) the rate of heating to the carbonization dwell temperature; iii) the amount of time the dried cryogel is held at the carbonization dwell temperature; iv) the flow rate of gas during carbonization; iv) the pressure of gas during carbonization; vi) the gas during carbonization; vii) use of a vacuum during carbonization; viii) the dwell temperature at which the carbonized cryogel is activated; ix) the rate of heating to the activation dwell temperature; x) the amount of time the dried cryogel is held at the activation dwell temperature; iv) the flow rate of gas during activation; v) the pressure of gas during activation; and vi) the gas during activation.

In another aspect of the present application, the method of tuning the pore structure of an activated cryogel in an electric double layer capacitor comprises changing at least one parameter chosen from: i) the dwell temperature at which the dried cryogel is carbonized; ii) the rate of heating to the carbonization dwell temperature; iii) the amount of time the dried cryogel is held at the carbonization dwell temperature; iv) the flow rate of gas during carbonization; iv) the pressure of gas during carbonization; vi) the gas during carbonization; vii) use of a vacuum during carbonization; viii) the dwell temperature at which the carbonized cryogel is activated; ix) the rate of heating to the activation dwell temperature; x) the amount of time the dried cryogel is held at the activation dwell temperature; iv) the flow rate of gas during activation; v) the pressure of gas during activation; and vi) the gas during activation.

In one embodiment, the method of tuning the pore structure of an activated cryogel in an electric double layer capacitor comprises changing at least one parameter chosen from: i) the dwell temperature at which the dried cryogel is carbonized; ii) the rate of heating to the carbonization dwell temperature; iii) the amount of time the dried cryogel is held at the carbonization dwell temperature; iv) the flow rate of gas during carbonization; iv) the pressure of gas during carbonization; vi) the gas during carbonization; and vii) use of a vacuum during carbonization. Alternately, the method of tuning the pore structure of an activate cryogel in an electric double layer capacitor comprises changing at least one parameter chose from viii) the dwell temperature at which the carbonized cryogel is activated; ix) the rate of heating to the activation dwell temperature; x) the amount of time the dried cryogel is held at the activation dwell temperature; iv) the flow rate of gas during activation; v) the pressure of gas during activation; and vi) the gas during activation.

In one aspect of the present application, the device can also comprise a pseudo-capacitor, in which case both electrodes comprise either metal oxides or conductive polymers. The metal oxide can, for example, comprise ruthenium oxide, iridium oxide or nickel oxide, and the electrically conductive polymer can, for example, comprise polypyrrol, polythiophene or polyaniline, or derivatives of these conductive polymers. In the case of pseudo-capacitors, pseudo-capacitances develop on the surface of the electrodes as a result of the movement of electric charges generated by oxidation and reduction processes at the electrodes.

In one embodiment of any of the aspects disclosed herein, the EDLC device has a tunable pore structure comprising a) mesopores that are evenly dispersed throughout the structure; and b) micropores that: i) have an effective length of less than about 10 nm as determined by TEM measurements; and ii) are connected to the adjoining mesopores such that the micropores are accessible to the electrolyte ions.

In one aspect of the present application, a graph of the pore size distribution within the activated carbon cryogel does not contain narrow peaks, but instead indicates a range of pore sizes.

In another aspect of the present application, the majority of the micropores of the activated carbon cryogel have an effective length of less than 3 nm. In one embodiment, more than 50% of the micropores have an effective length of less than 3 nm; in another embodiment, more than 60%, or more than 70%, or more than 80%, or more than 90% of the micropores have an effective length of less than 3 nm.

EXAMPLES

Activated Carbon Cryogel Production and BET Analysis

The activated cryogels used in the super capacitor electrode materials are made from the standard chemicals: resorcinol {99+%, Sigma-Aldrich, $C_6H_4(OH)_2$}, formaldehyde solution {37%—stabilized with methanol ($C_2H_5OH$), Fisher Scientific, $COH_2$}, sodium carbonate (99.5%, Sigma-Aldrich, $NaCO_3$}, and tert-butyl-alcohol (t-butanol) {99.8%, J. T. Baker, $(CH_3)_3COH$}, and optionally trifluoroacetic acid {99%, Aldrich, $C_2HF_3O_2$. These chemicals were used as received without further treatment. A series of activated carbon cryogels were fabricated. The molar ratio (R/F) of resorcinol (R) to formaldehyde (F) was maintained at 1:2 for all sols, while the molar ratio (R/C) of resorcinol to sodium carbonate catalyst (C) and the mass ratio (R/W) of resorcinol to water (W) were varied systematically. The sols were prepared by admixing resorcinol and formaldehyde in stirred distilled water followed by addition of catalyst at room temperature. The resulting sols were sealed in glass ampoules or vials and gelled at 90° C. for at least 24 hours or until gelation was complete (as long as 7 days). The resulting resorcinol-formaldehyde (RF) hydrogels underwent solvent exchange to replace water with t-butanol by rinsing 3 times in fresh t-butanol for 24 hours each time, followed by subsequent freeze drying for 3 days. The resulting RF cryogels were pyrolyzed at 1050° C. in $N_2$ for 4 hours then activated at 900° C. in $CO_2$ with a flow rate of 400 SCCM (standard cubic centimeters per minute) for various durations. The pore structure was characterized by nitrogen sorption at 77 K and $CO_2$ sorption at 273 K on a Quantachrome NOVA 4200e (Quantachrome Instruments, Boyton Beach, Fla.).

In one aspect of the present application, an acid rinse step using trifluoroacetic acid following gelation is included in the preparation of the activated carbon cryogel.

Electrochemical Analysis and Capacitance Measurements Using Cyclic Voltametry and Chronopotentiometry Electrodes were prepared by mixing powdered activated carbon cryogel with 1%-3% by weight PTFE (polytetrafluoroethylene) binder. The mixture was rolled and then cut into discs 75 µm thick and 9 mm in diameter.

The electrochemical test cell was made of a perfluoroalkoxy T-cell with stainless steel contacts. This cell has one advantage in that it mimics the conditions of a working capacitor and preserves the sample in an inert environment, such as for example, Argon. Symmetric carbon-carbon (C—C) capacitors were assembled in an Argon glove box. A porous polypropylene membrane (Celgard, by Celanese Plastics, Co., Ltd.) 25 µm thick served as the separator. Once assembled, the samples were soaked in electrolyte for 20 minutes or more depending on the porosity of the sample. The electrolyte used was tetraethylammonium tetrafluoroborate (TEATFB) in saturated 50/50 propylene carbonate (PC)/dimethylcarbonate (DMC).

Figure 1:
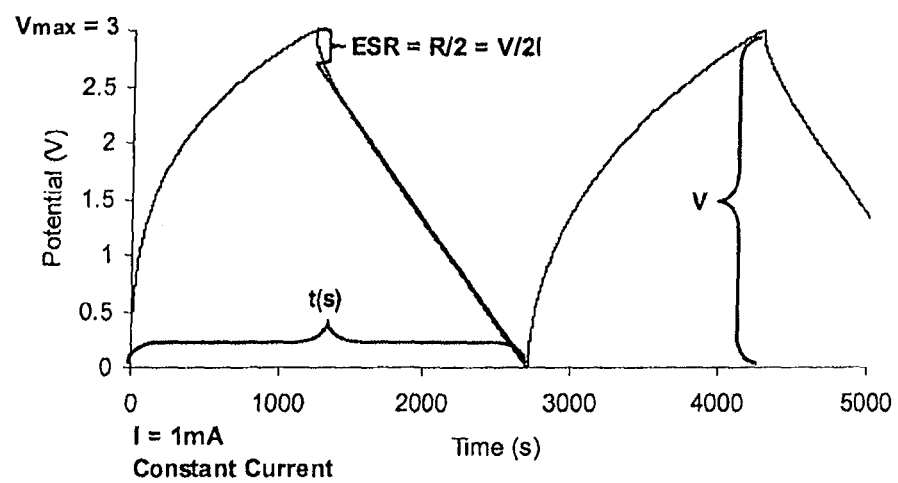
FIG. 1 is a chronopotentiometry (CP) curve for a two cell electrode demonstrating how the values for $V_{max}$, I, V, t, and ESR (in bold) are measured in order to determine capacitance, specific energy and power.

The capacitance and power output of the test cell was measured using cyclic voltametry (CV) and chronopotentiometry (CP) at various voltages (ranging from 1.0-3.5 maximum voltage) and current levels (from 1-10 mA) on an CHI electrochemical work station (CHI Instruments, USA). The capacitance (C) was calculated from the discharge curve of the potentiogram using the formula:

$$C = i/s \qquad \text{Equation 1}$$

where i is the current (A) and s=V/t is the voltage rate in V/s. Since the test capacitor is a symmetric C—C electrode, the specific capacitance ($C_S$ in units of F/g)) was determined from:

$$C_s = 2C/m_e \qquad \text{Equation 2}$$

where $m_e$ is the mass of a single electrode. The specific energy ($E_s$ in units of W/g) and power ($P_s$ in units of J/g) were determined using:

$$E_s = \frac{1}{4}\frac{CV_{max}^2}{m_e} \qquad \text{Equation 3}$$

$$P_s = E_s/4ESR \qquad \text{Equation 4}$$

where C is the measured capacitance, $V_{max}$ is the maximum test voltage, and ESR is the equivalent series resistance obtained from the voltage drop at the beginning of the discharge. FIG. 1 shows how the values for i, s, V, t, Vmax, and ESR are calculated from the CP curve to determine values for the above equations.

Analogously, these equations can be used to calculate the specific capacitance, the specific energy, and the specific power of an electrode that is not a symmetric carbon-carbon electrode, as is exemplified herein.

Statistical Analysis

A Factorial Design of Experiments (DOE) was used to investigate the impact of each variable in the pore structure and performance of the activated cryogel in the electrode. Although DOE is not often used in this field of science, it was employed in this investigation to make use of the enormous amount of data generated by this effort at characterizing the impact of each different activated carbon cryogel processing parameter. The Taguchi L2 statistical design (from DOE Pro software from Digital Computations, Inc.) was used to evaluate the relative impact of each variable.

The samples were tested in two steps; in each, the variables investigated were: resorcinol/catalyst ratio (R/C), resorcinol/water ratio (R/W), the temperature and length of time of the pyrolysis of the RF cryogel, the temperature and length of time of the carbon dioxide activation. The first test employed a more typical design to find the optimal range for the RC ratio (one variable that influences the structure) as well as the ideal degrees of activation. This study then gave rise to a second test to evaluate the impact of R/C and activation each within an optimized range as well as fine tuning other variables within the best performing values of R/C and activation. Table 1 shows the processing parameters for the six different variables that were used in the Taguchi L12 design of experiments approach. By using this experimental plan and the DOE Pro software, Applicants identified the better of two high and low values while accounting for the first level interaction of multiple variables.

In the examples disclosed herein, all sol gel, and drying parameters were the same for all samples. Pyrolysis and activation parameters varied for Samples 1 to 4 as described below. Only R/C and % activation were used to modify the structure of the carbon. Particular details for the samples referenced herein are provided below:

Sample 1 (also referred to as "R/C 50") was prepared using an R/C of 50, an R/W of 0.25. $N_2$ pyrolysis took place at 1050° C. for 240 minutes. Activation took place at 900° C. for a period of time necessary to achieve 70% activation Sample 2 was prepared using an R/C of 50, an R/W of 0.125. $N_2$ pyrolysis took place at 1050° C. for 60 minutes. Activation took place at 900° C. for a period of time necessary to achieve 45% activation.

Sample 3 (also referred to as "R/C 25") was prepared using an R/C of 25, an R/W of 0.25. $N_2$ pyrolysis took place at 1050° C. for 240 minutes. Activation took place at 900° C. for a period of time necessary to achieve 70% activation.

Sample 4 was prepared using an R/C of 50, an R/W of 0.125. $N_2$ pyrolysis took place at 1050° C. for 60 minutes. Activation took place at 900° C. for a period of time necessary to achieve 25% activation.

TABLE 1

Taguchi L12 experimental parameters used for finding the best processing conditions over 6 different variables:

| | Sol-gel Parameters | | $N_2$ Pyrolysis | | $CO_2$ Activation | |
|---|---|---|---|---|---|---|
| Row | R/C | R/W | Temp (° C.) | Time (min) | Temp (° C.) | Time (min) |
| 1 | 25 | 0.125 | 900 | 60 | 800 | 60 |
| 2 | 25 | 0.125 | 900 | 60 | 800 | 60 |
| 3 | 25 | 0.125 | 1050 | 240 | 900 | 180 |
| 4 | 25 | 0.25 | 900 | 240 | 800 | 180 |
| 5 | 25 | 0.25 | 1050 | 60 | 900 | 60 |
| 6 | 25 | 0.25 | 1050 | 240 | 900 | 180 |
| 7 | 50 | 0.125 | 1050 | 240 | 900 | 180 |
| 8 | 50 | 0.125 | 1050 | 60 | 900 | 60 |
| 9 | 50 | 0.125 | 900 | 240 | 800 | 180 |
| 10 | 50 | 0.25 | 1050 | 60 | 900 | 60 |
| 11 | 50 | 0.25 | 900 | 240 | 800 | 180 |
| 12 | 50 | 0.25 | 900 | 60 | 800 | 60 |

Electrochemical Analysis and Capacitance Measurements Using Impedance Spectroscopy Materials and Preparation Each activated cryogel sample, was dried at 60° C., then each mixed with a Teflon binder (polytetrafluoroethylene) at 3.0% by weight. Each mixture was thoroughly blended and formed into 0.002"-thick sheets.

Each sheet material was punched using a steel die to make discs 0.625" in diameter. Six electrode discs of each material were weighed to an accuracy of 0.1 mg. The electrodes were dried under vacuum conditions (mechanical roughing pump) at 195° C. for at least 10 hours as the last preparation step. The average mass and density of a pair of electrodes is shown in Table 2.

TABLE 2

Electrode masses and volumes for test capacitors fabricated

| Sample Name | Average mass of two electrodes (mg) | Combined thickness of two electrodes (inches) | Volume of two electrodes (cm$^3$) | Electrode Density (g/cm$^3$) |
|---|---|---|---|---|
| 1 | 9.6 | 0.004 | 0.020 | 0.48 |
| 2 | 7.1 | 0.004 | 0.020 | 0.35 |

Test Capacitors

After cooling from 195° C., the vacuum container containing the electrodes was transferred into a drybox while still under vacuum. All subsequent assembly work was performed in the drybox. The electrode discs were soaked in an organic electrolyte for 10 minutes then assembled into cells. The electrolyte was an equal volume mixture of propylene carbonate (PC) and dimethylcarbonate (DMC) that contained 1.0 M of tetraethylammonium-tetrafluoroborate (TEATFB) salt.

An open cell foam type separator material was used to prepare the test cells. The separator was ~0.002" thick before it was compressed in the test cell. The conductive faceplates of the test cell are aluminum metal with a special surface treatment to prevent oxidation (as used in the lithium-ion battery industry). The thermoplastic edge seal material was selected for electrolyte compatibility and low moisture permeability and applied using an impulse heat sealer located within the drybox.

Figure 2:
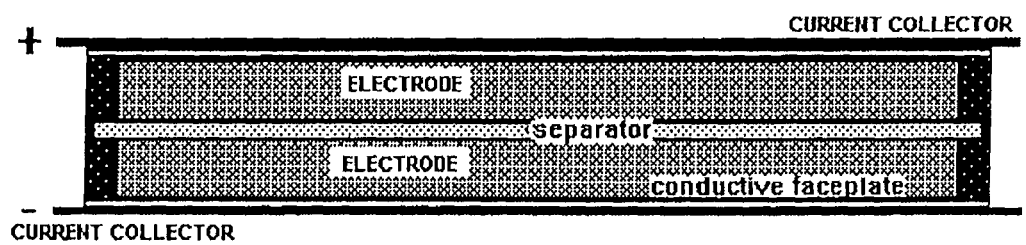
FIG. 2 is a drawing of a prototype capacitor cells constructed to test the electrode materials.

Two test cells were fabricated according to the same fabrication method for each test material. The assembled cells were removed from the drybox for testing. Metal plates were clamped against each conductive face-plate and used as current collectors. The cross section of an assembled device is shown in FIG. 2. The electrodes were each 0.002" thick, and the separator 0.002" thick before compression in the cell. Electrodes had a diameter of 0.625". Capacitor cells were conditioned at 1.0 V for ten minutes, measured for properties, then conditioned at 2.0 V for 10 minutes and measured for properties.

DFT (Density Functional Theory Calculations)

The DFT results associated with $N_2$ isotherms at 77K or $CO_2$ isotherms at 273K are derived from the NLDFT (Non Local Density Functional Theory) kernels for $N_2$/carbon (77K) and $CO_2$/carbon (273 K) (as well as the GCMC (Grand Canonical Monte Carlo) kernel for $CO_2$ adsorption in carbons), which are implemented into the Autosorb software (developed by Quantachrome instruments as part of their NovaWin package; NLDFT kernels have been developed by Dr. Neimark (now Rutgers University) and Dr. Peter Ravikovitch. These implementations of NLDFT for carbon materials are based on a model of independent pores (e.g. slit pores of cylindrical pores) with ideal graphitic walls. Details of the kernels (chosen fluid-fluid and fluid-wall interactions potentials, adsorption potential etc.) are described in the papers of Ravikovitch and Neimark [see e.g. 27 (and references therein)]. Although this paper addresses mainly the slit-pore geometry (also used in this patent), it is also relevant for kernels where a cylindrical pore geometry has been assumed. This NLDFT method is now widely accepted and is featured in a recent standard by ISO (ISO-15901-3: Pore size distribution and porosity of solid materials by mercury porosimetry and gas adsorption—Part 3: Analysis of micropores by gas adsorption).

Test Equipment and Measurements

All measurements were performed at room temperature using instruments that include: Frequency Response Analyzer (FRA), Solartron model 1250; Potentiostat/Galvanostat, PAR 273; Digital Multimeter, Keithley Model 197; Capacitance test box S/N 005, 500 ohm setting; RCL Meter, Philips PM6303; Power Supply, Hewlett-Packard Model E3610A; Balance, Mettler H10; Mitutoyo dial indicator 2416-10; Leakage current apparatus; Battery/capacitor tester, Arbin Model BT2000.

The test capacitors were conditioned at 1.0 V then shorted and the following measurements were made: 1 kHz equivalent series resistance (ESR) using the RCL meter, charging capacitance at 1.0 V with a 500 ohm series resistance using the capacitance test box, leakage current at 0.5 and 1.0 V after 30 minutes using the leakage current apparatus, and electrochemical impedance spectroscopy (EIS) measurements using the electrochemical interface and FRA at 1.0 V bias voltage. Then the test capacitors were conditioned at 2.0 V then shorted and the following measurements were made: 1 kHz equivalent series resistance (ESR) using the RCL meter, charging capacitance at 2.0 V with a 500 ohm series resistance, leakage current at 1.5 and 2.0 V after 30 minutes using the leakage current apparatus, and EIS measurements at 2.0 V bias voltage.

Finally charge/discharge measurements were made using the Arbin. These measurements included constant current charge/constant power discharge cycles between 1.0 V and 2.0 V at power levels from 0.01 W to 0.2 W and constant current charge/constant current discharge measurements between 1.25 V and 2.5 V. The constant power discharge measurements were used to develop Ragone relationships for the test capacitors. The constant current charge measurements were used to determine the quantity of energy stored and the efficiency of energy storage at energy capture times ranging from 3 seconds to ~80 seconds. This test provides a measure of how the electrode material might perform for example, during a braking event in a hybrid vehicle.

Results of BET and Electrochemical Analysis and Capacitance Measurements Using Cyclic Voltametry and Chronopotentiometry Direct comparison between power, capacitance, specific energy, or other performance parameters of EDLC electrode materials is difficult. This is due to substantial variation in electrolyte chemistry and experimental set-up or measurement technique. For instance, water based electrolytes as compared to organic electrolytes enable much higher (~2×) specific capacitance but generally yield lower power due to their lower voltage range. [1] The higher capacitance in aqueous electrolytes is often attributed to pseudocapacitance due to oxygen containing functional groups which are active in many aqueous electrolytes. [2,3] Other discrepancies arise because two electrode cells vs. three electrode cells can yield significantly different results if great care is not taken with the reference electrode in a three electrode cell and it is often the case that the method for reporting capacitance from a single electrode in a three electrode cell results in a 4× increase in the reported capacitance over the material in that of a two electrode cell. [4] Finally, there is some variation between measurements taken using CP/CV vs. impedance spectroscopy. In this application, we have chosen to use a two electrode cell that closely imitates a working capacitor as measured using CV/CP. The electrolyte salt, tetraethylammonium tetrafluoroborate, used in the experiments disclosed herein is perhaps the most common for organic solvents. Comparisons to other work or products in this application use the same electrolyte salt, experimental setup, and measurement technique. The performance is reported relative to the weight of the electrode only rather than the entire cell.

Figure 3:
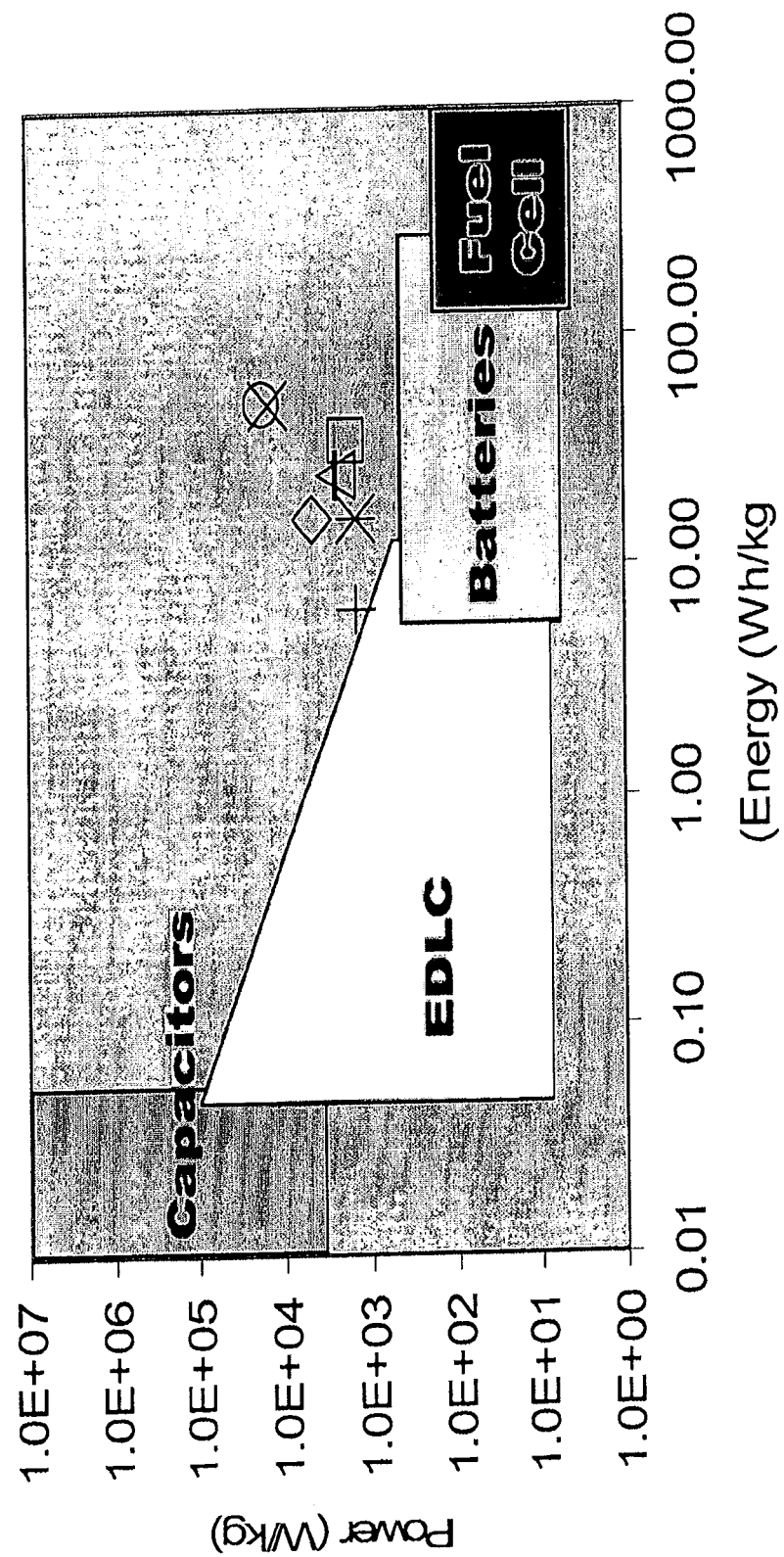
FIG. 3 is a graph of Energy (Wh/kg) vs. Power (W/g) in log 10 scale for activated carbon cryogels made with variations in R/C ratio and % activation as compared to performance regions for traditional dielectric capacitors, EDLCs currently in production, electrochemical batteries, and fuel cells.

FIG. 3 shows the power and energy density of all samples tested in the capacitor test cell at a voltage of 3.5V and current of 1 mA. High values of power and energy density are attained for most samples, but there is an order of magnitude difference in performance between the best and worst electrodes despite the fact that these samples are all derived from very similar materials and processed under similar conditions. In this study, with the exception of R/C and % activation (activation induced weight loss), all sol gel, drying, pyrolysis, and activation parameters were the same for all samples. Only R/C and % activation were used to modify the structure of the carbon and are therefore believed to be the variables responsible for the performance differences noted in FIG. 3.

Figure 4A:
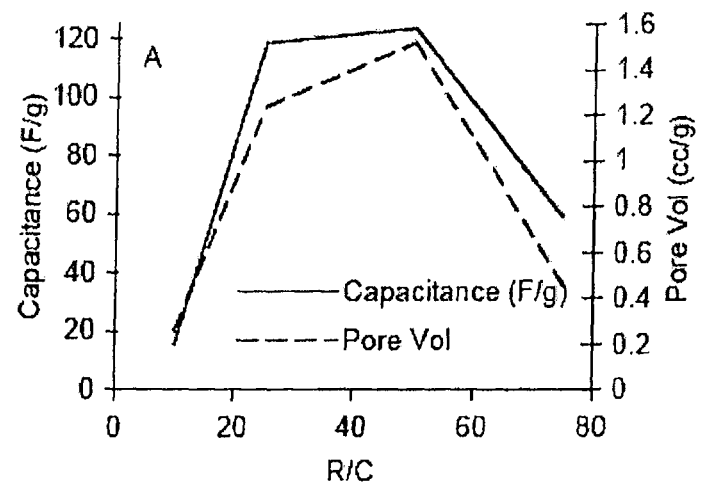
FIG. 4A is a graph of R/C (resorcinol/catalyst ratio) of initial sol for activated carbon cryogels with activation at 70% vs. capacitance (F/g) and pore volume (cc/g).
Figure 4B:
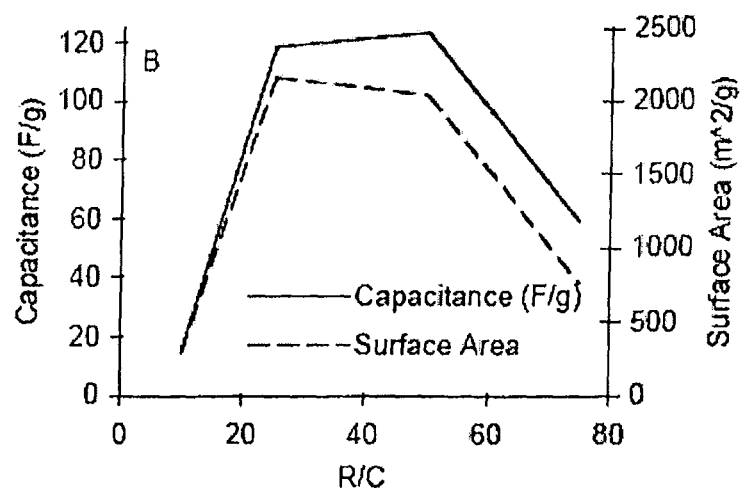
FIG. 4B is a graph of R/C vs. capacitance and surface area ($m^2/g$).

The R/C ratio of the initial sol appears to influence the final pore structure of the carbon electrode as well as the capacitance as suggested in FIGS. 4 A and B. The mechanism for the influence of the catalyst on the structure of carbon aerogels and cryogels is well documented in the literature. [5, 30, 31] Pore volume and surface area trends (as measured by nitrogen sorption) correspond reasonably well with capacitance, but upon close observation the data are not aligned. This is especially noticeable between the R/C 25 and 50 carbon cryogels, which have very similar capacitance. The R/C 25 material has lower overall pore volume but higher surface area indicating that the porosity is smaller in average pore size whereas the R/C 50 carbon has higher pore volume and lower surface area indicating a tendency towards larger pores. High specific surface area allows for maximum adsorption of electrolyte ions per unit weight, but can be skewed as an indicator because very high surface area is often exaggerated by the BET calculations. High pore volume allows for good transport of electrolyte into the pores of the electrode to enhance charge and discharge kinetics, thus allowing the full surface area to be utilized. But in activated carbons, high pore volumes can be attained with either many very small micropores or few large mesopores. Either of these would not be completely desirable as a capacitor electrode, because the smallest pores may not admit electrolyte ions and the larger pores have lower specific surface area. Thus more detail is needed than just pore volume and surface area in order to understand the difference in performance between the activated carbon cryogels with different R/C values.

Figure 5:
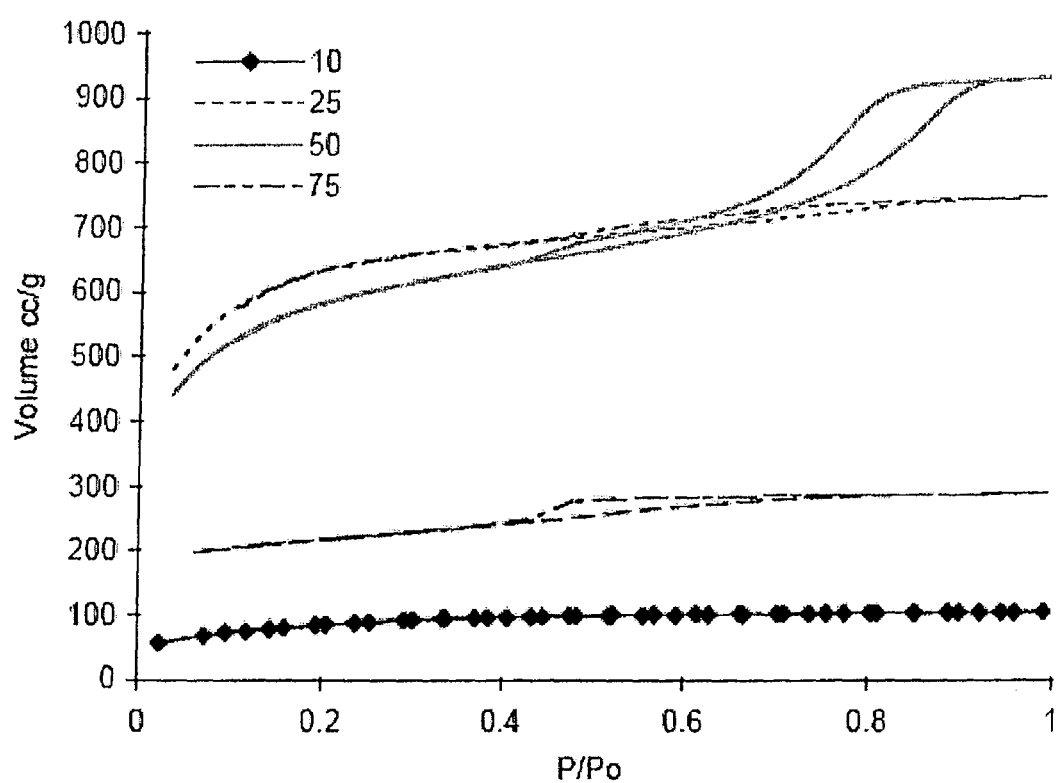
FIG. 5 is a graph of nitrogen sorption isotherms at 77 K for activated carbon cryogels made using R/C ratios of 10, 25, 50, and 75.

Nitrogen adsorption/desorption isotherms reveal more about the pore structure of the material and can provide some insight into how it impacts the final performance. FIG. 5 shows nitrogen sorption isotherms for the same four samples (activated to the same activation percentage but with different R/C values). These isotherms provide a better explanation for the substantial difference in performance from one RC value to another. By looking first at the isotherms for the R/C 25 and R/C 50 samples, we can distinguish between the pore structures of each. As evidenced by the large jump in adsorbed $N_2$ per gram of carbon at very low pressure, the samples have similar micropore volume per unit weight, but the R/C 25 has slightly more. After a pressure of 0.4 atm, the similarities disappear and the isotherm for the R/C 50 sample begins to curve upward as significant amounts of mesoporosity begin filling at higher pressures. The R/C 25 sample also displays some mesopore filling at higher pressures, but only a small fraction of the R/C 50 sample. This results in an observation that the R/C 50 sample has significantly higher pore volume (volume of $N_2$ adsorbed at 1 atm) than the R/C 25 sample, but that the extra pore volume exists as mesoporosity which was filled at higher pressures. As noted above, the specific surface area of the R/C 25 sample is higher due to its pore volume consisting of more micropores and less mesopores.

While the R/C 25 and R/C 50 samples have high capacitance, high surface area and high pore volume, the R/C 10 and R/C 75 have much lower capacitance. The R/C 75 sample shows a moderate level of microporosity with some mesoporosity, and the R/C 10 sample is almost completely microporous (note the lack of hysteresis) with a small overall pore volume. Comparing the R/C 25 isotherm and the R/C 75 isotherm is also beneficial. They both have similar amounts of mesoporosity as can be judged by their similar hysteresis loops and the increase in pore volume from a pressure of 0.4 atm up to 1.0 atm. The difference between these two lies mainly in the microporosity. There micropore volume of the R/C 75 sample is much lower than that of the R/C 25 sample. However, beyond a simple assessment of the volume, the micropores of the R/C 25 sample result in an isotherm that gradually slopes up to around 0.2 atm (a feature present in the R/C 50 sample as well) indicating the presence of small mesopores and large micropores. However, the R/C 75 sample jumps sharply to a micropore volume of around 200 cc/g and then immediately flattens out indicating its microporosity is mostly of one size and that the micropores are quite small. From these samples we can easily tell that both microporosity and mesoporosity are important properties in this carbon-TEATFB system. It is also quite apparent that changing the R/C ratio of these synthetic activated carbons can alter the features of both the microporosity and mesoporosity. In turn, these features, which can be resolved by studying the isotherms, have an influence on the capacitance of an electrode made with these carbons.

The surface area can be an important parameter for an EDLC electrode, but it must be readily accessible. Micropores that are small enough to admit a nitrogen molecule (down to 0.35 nm) may not be accessible to larger electrolyte ions—especially cations. However, larger micropores and small mesopores may be most beneficial to the development of a large electro active surface since they are likely large enough for electrolyte ions yet small enough that the material has a large area per unit weight. However, the mesopore volume of a sample is also a variable that can enhance fast ion transport and maximize power. A matrix that consists only of very small pores may not have a fully utilized surface because the tortuous path of those very small pores may prevent ions from reaching certain areas. One example of an optimized structure would have larger pores to act as a transmission line and electrolyte transport pathway, and fully utilized micropores to develop the highest specific capacitance. [6]

This sort of structure has been attained most notably in the R/C 50 carbon cryogel. It has high microporosity as well as a mesoporous network for ion conduction. The capacitance of electrodes made from this sample is higher than those from the R/C 25 sample. The surface area is lower, but the mesopores have allowed for higher utilization of the pores. TEM (transmission electron microscopy) has revealed that the mesopores in these materials are only a few nanometers away from each other, so the maximum length of micropores is only a few nanometers. This short diffusion distance has resulted in higher power for electrodes made from these materials as measured in the present study. This structure has been achieved by simply tuning the R/C ratio of the initial sol.

TABLE 2.5

Pore volume ($cm^3/g$) at specific pore size increments for three different samples

| | Sample Number | | |
|---|---|---|---|
| Pore Size (nm) | 3 | 1 | 4 |
| 0.6-1 | 0.15343 | 0.1906 | 0.017553 |
| 1-2 | 0.50247 | 0.35442 | 0.360094 |
| 2-4 | 0.17125 | 0.18952 | 0.56948 |
| 4-6 | 0.06211 | 0.20279 | 0.36707 |
| 6-8 | 0.0132 | 0.2114 | 0.1764 |
| 8-10 | 0.0028 | 0.0522 | 0.1013 |

Figure 6:
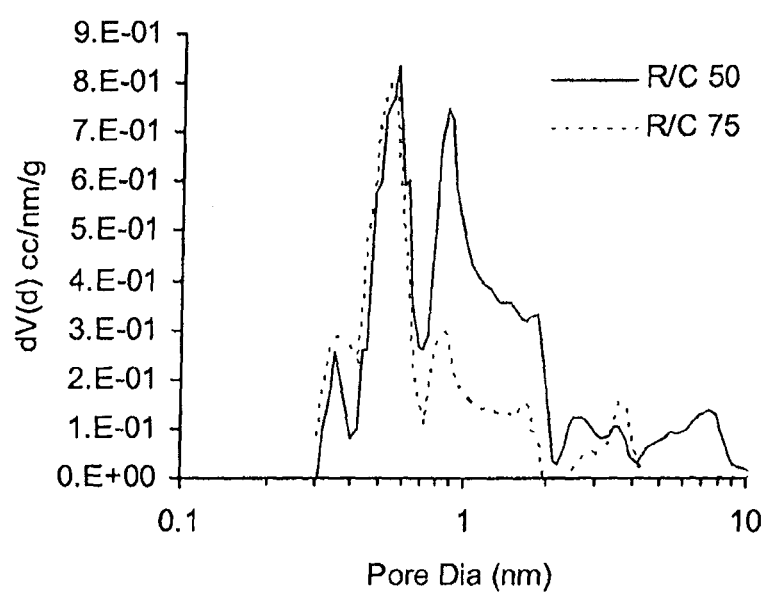
FIG. 6 is a pore size distribution for two samples with R/C ratio of 50 and 75 (all other parameters held equal).

While nitrogen isotherms reveal much about the pore structure of the carbons, the pore size distribution (derived using density functional theory—DFT—and $N_2$ as well as $CO_2$ isotherms) allows a more quantitative analysis of the pore structure. Quantifying the effect of specific ranges of pore size allows further insight into the interaction between electrolyte and porous electrode. FIG. 6 shows the pore size distribution (PSD) of two different samples using different resorcinol to catalyst ratios (R/C) to alter the structure of the polymer precursor which impacts the final carbon structure after drying, pyrolysis, and activation. The values were derived from $N_2$ and $CO_2$ sorption and DFT analysis. For the R/C 75 carbon cryogel, the most prominent peak is in the range of the very smallest pores (ranging from about 0.3 to about 0.6 nm). There are other peaks in the range from about 0.7 nm to about 2 nm as well as one at about 3.7 nm. Conversely, the carbon cryogel with an R/C ratio of 50 shows two maxima—one like the R/C 75 cryogel, centered at 0.5 nm and another centered on 0.8 nm. This second peak extends with substantial pore volume all the way up to about 2.0 nm where it eventually drops off. There are also two main mesoporous peaks between about 2.0 and about 10.0 nm.

It is possible to produce carbon cryogels with a wide range of pore size distributions and large pore volumes at numerous different pore sizes. FIG. 6.5 below shows the three separate carbon cryogels which together demonstrate an ability to produce high pore volume at a wide range of pore sizes. By tuning the various processing parameters of the carbon cryogel high pore volumes can be reached at a many different pore sizes depending on the need for an EDLC with high power, high energy, density, capacitance, or a combination. Additionally, these pore size distributions can be tuned to adjust to a specific electrolyte salt molecule. Table 2.5 shows the pore volume of each sample within 6 different pore size ranges.

Figure 7C:
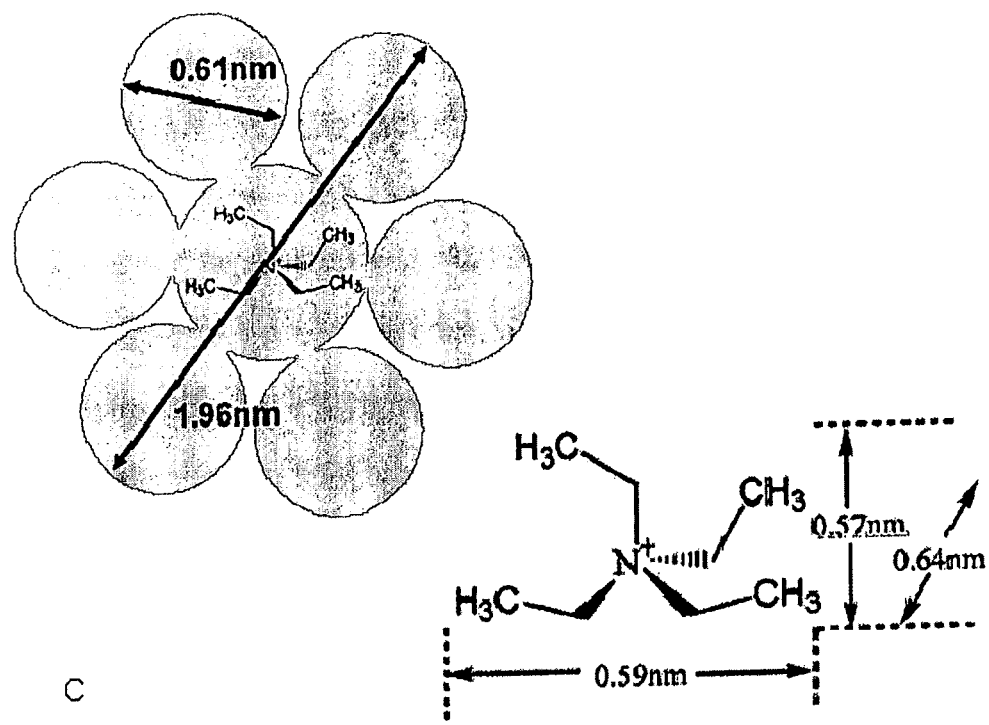
FIG. 7C are dimension diagrams of solvated TEA ion and unsolvated TEA ion.

The capacitance of the R/C 50 sample is 124 F/g, while the R/C 75 carbon cryogel is only 59 F/g when charged at a maximum voltage of 3.5 V and current of 5 mA. In order to further examine this disparity in capacitance and how it is affected by the PSD, the other two samples from FIG. 4 and FIG. 5 were measured for PSD as well as capacitance. FIG. 7a shows how closely the trend for pore volume in different pore diameter ranges matches the trend for capacitance as R/C increases from 10 to 75. To make the comparisons more straightforward, each data set was altered by a specific multiplier that forced the value at R/C 10 to 1.00. The pore volume data was broken up into four distinct ranges based on the pore size distribution of these samples as well as ion size considerations. Without being bound by theory, one possible explanation for these ranges is as follows. The maximum dimension of the TEA cation is 0.64 mm while along its short axis it is somewhat less than 0.6 nm (FIG. 7c). [7] For this reason one range we investigated in studying the PSD of our samples is those pores smaller than the size of the TEA ion, e.g. a diameter smaller than about 0.6 nm. However, it is often thought that ion size is determined by the solvation layer as well as the molecular dimensions. For propylene carbonate this would yield a solvated ionic diameter of 1.96 nm as shown in FIG. 7c. For this reason, 2.0 nm was chosen as the threshold between two regions of interest in the PSD. The other two cut off values (1.0 nm and 4.0 nm) were chosen because each carbon cryogel possessed a peak ranging from about 0.6 and about 1.0 nm and ranging from about 2.0 nm to about 4.0 nm. Thus the pores size distribution is divided into 4 separate regions that may drive performance through different mechanisms. The data in FIG. 7b was simply plotted against capacitance instead of R/C.

In studying the relationship between the trends shown in FIG. 7, several things are notable. At first glance it appears that there is a very close relation between the smallest pores <0.6 nm and the specific capacitance for R/C 10, 25, and 50. However this relationship does not hold for the R/C 75 cryogel. Indeed upon further inspection of the PSD for all cryogels (not shown), the apparent trend for the first three samples is coincidental and occurs because for all but the R/C 75 cryogel, there are congruent pore volumes in other ranges that contribute to the capacitance. The range of pores that most closely tracks the trend for capacitance is the pore range from about 0.6 to about 1.0 nm. In looking at the remaining two pore ranges, they are opposite but almost equidistant from the capacitance trend with the range from about 1.0 to about 2.0 nm tracking slightly closer than the trend of the range from about 2.0 to about 4.0 nm. In order to more clearly assess the connection between these trends, the data is plotted in a linear fashion in FIG. 7b. This arrangement of data clearly shows that the 0.6-1.0 nm data most closely aligns with the capacitance data and the pore volume <0.6 nm aligns poorly while the other two pore volume ranges lie somewhere in between. It should be noted that the PSD for numerous activated carbon cryogels under study in our research points to the pore range between 0.6-1.0 nm as the one important driver of capacitance.

Without being bound by theory Applicants believe that the combination of high energy and power density can be attributed to close control over the structure and chemical makeup of the carbon at all stages of processing. The purity of the material can be easily controlled by maintaining high purity in the synthetic precursors. The structure of the carbon cryogel based electrode is controlled through the tunability of the precursor, a sol-gel derived polymer, as well as manipulation of activation parameters. Since the fabrication of the samples shown in FIG. 4 through FIG. 7 is the same in every way other than R/C ratio, they enable comparison of the relationship between pore size distribution and capacitor performance. The PSD of these samples has several peaks. It should be noted that bimodal pore size distributions are not uncommon in highly activated carbons—especially those with surface area >2000 m$^2$/g. [8] This is attributed to small micropores which are naturally occurring micropores and larger micropores (or small mesopores) which have been opened slightly due to activation. The ability of DFT to expose the intricacy of the carbon PSD has lead to many reports of bimodal or multimodal PSDs in activated carbon. [9, 10, 11, 12]

Without being bound by theory, we would expect that capacitance could be determined by the accessible pore volume in specific ranges, because capacitance is directly linked to the number of ions adsorbed on the surface of the pores in the electrode as shown by Equation 5:

$$C = \frac{q}{\Delta Um} \qquad \text{Equation 1}$$

where C is capacitance, q is charge, $\Delta U$ is the voltage range of the capacitor, and m is the mass of the electrode. [13] In addition, geometry generally dictates that the smaller the pores, the larger the specific surface area; this in turn results in high specific capacitance—as long as those pores are accessible to the electrolyte. Thus we could expect that a large pore volume of the smallest pores accessible to the electrolyte ion will tend to drive high specific capacitance. The data in FIGS. 7a and b suggest that the pores in the range from about 0.6 to about 1.0 nm have the closest relation to capacitance. If we assume that the TEA ion is unsolvated, then it fits in these pores and we have agreement with the above stated geometric relationship between pore size, specific surface area, and specific capacitance. However, for this relationship to be credible, the issue of solvation layer or no-solvation layer must be resolved.

The issue of ion solvation and its relation to microporous capacitance is something that appears to be under debate in the literature. As mentioned above, the traditional view of ions in solution is that they possess a bulky solvation layer which would typically prevent access to micropores. However, there is also significant evidence in both capacitor research and electrolyte chemistry that points toward either a very loose solvation layer or none at all in certain systems.

With the advent of $N_2$ surface adsorption systems able to accurately achieve the very low pressures necessary to resolve micropore adsorption—in combination with Density Functional Theory for interpreting the data, these tools could be used to better understand the relationship between micropores and meso/macropores in carbon electrodes. The ion sieving effect was observed where if ions are too large to fit into the pores, the surface of those pores can not be utilized to hold charge. They also describe a pore threshold of ~0.7 nm for a TEATFB salt. [14] However, in order to better understand whether micropores are useful in super capacitor applications, a closer look at the electrolyte salt and solvent is helpful. These salt components are much more complex than standard dual element or simple acid/base electrolytes—especially the cation TEA. Typically salts will dissociate in a solvent and a solvation layer is formed around the individual ions to counteract their charge. However, research on these carbonate solvents in combination with alkyl ammonium based salts like TEA, has brought into question the occurrence of such phenomena. Much of the work has found that the ions appear to be bound in a much looser form due to a relatively weak surface charge which produces a weak solvent—cation interaction. The low surface charge of the TEA ion is not entirely surprising after a simple observation of the relatively non-polar ethyl groups surrounding the charged N+.

A simplistic model of the TEA and TFB ions and their respective solvation layers has shown that in a propylene carbonate based solvent, the solvated ions are 1.96 nm and 1.71 nm respectively. In this model, the unsolvated cation and anion are taken to be 0.74 nm and 0.49 nm respectively. (It should be noted that there is some range in the understood diameter of the TEA ion between 0.678 nm and 0.800 nm). [15, 16, 17] The solvated ion diameters are based on an assumption that the ions are surrounded on all sides by a solvation layer 0.61 nm thick (e.g. 0.74+2×0.61=1.96 nm) [18] similar to that shown in FIG. 7C. The near 2 nm solvated ion diameter values give rise to the belief by many that a solvated ion would not fit in the small micropores that are present in many activated carbons. Application of Stokes law (Equation 6) which defines the force (f) acting on a spherical particle of radius (r) moving with uniform velocity v in a viscous fluid (n) has shown that this may not be true. In this relation, the first term represents the force built up due to pressure in front of the moving particle and the second term is due to frictional force parallel to its direction of motion. In describing the relation between the ion and the solvent the equation dictates that when the second term is equal to zero the result is defined as perfectly "slippy" or x=4 and when the second term is at its maximum, x=6 or perfect "stick" occurs.

$$f=4\pi\eta rv+2\pi\eta rv=x\zeta\eta rv \qquad \text{Equation 2}$$

Conductivity measurements show that TEA ions in propylene carbonate (along with nearly every other bulky cation studied) were almost perfectly "slippy" or that no solvation layer exists. In contrast, a $Li^+$ ion which has a very high surface charge concentration shows perfect "stick" due to a strongly bound solvation layer. This observation is further bolstered by measurements of the association constant between anion and cation. For a contact pair (two "touching" ions) the association constant is related to the distance that separates the two opposite charges and is determined only by the two ionic radii. For solvated ions, the ion separation distance increases on account of a layer of solvent around each ion and hence the association constant is significantly lower. For all the "slippy" ions studied, the association constant was higher than that predicted by the presence of a solvation layer indicating formation of contact ion pairs in propylene carbonate and hence lack of a solvation layer. [19] This observation has been corroborated by different approaches in other work. For instance ion sieving has been used to rank the relative size of ions in solvent. Using this approach, it was estimated that size of the TEA cation in propylene carbonate solvent was larger than that of the $Li^+$ ion. This would be quite surprising if we assumed equal solvation of these cations considering that the $Li_+$ ion is only 0.152 nm in diameter. However, when the absence of a solvation layer on the TEA is considered—the result is not so surprising. [20] In other work where viscosity was measured it was found that Li based electrolytes were considerably more viscous than TEA based electrolytes with the same counter ion in carbonate solvents. In order to rule out the effect of the anion on viscosity, the study further looked at a number of different Li based systems and found that the larger the anion, the larger the viscosity, thus bolstering the argument that the solvated $Li^+$ ion is indeed larger than the loosely or unsolvated TEA ion. [21] A number of studies appear to be consistent with our own evidence which suggests that a significant portion of the capacitance in our system is related to TEA ions ~0.7 nm in diameter attracted to a charged surface inside the substantial micropore volume inherent in our carbon cryogel electrodes.

In addition to manipulation of the pore size distribution using R/C ratio, pore accessibility also should be considered. Two things may impact pore accessibility: obstructions to the pore and pore length. It is quite likely that pores may be large enough but that the entrance to these pores could be inaccessible to larger electrolyte ions (as compared to $N_2$ molecules); or that a contorted pathway might prevent full utilization of the pore. In considering this possibility, the mechanism for exposing the micropores—$CO_2$ activation—is relevant. All of the carbon cryogels shown in the FIG. 4 and FIG. 5 are for carbon cryogels activated to 70% (70% of the carbon starting material was removed during activation). FIG. 8 shows the effect that different levels of activation have on surface area, capacitance and pore volume for an R/C 75 carbon cryogel. Activation increases the surface area and pore volume of the carbon up to a point where it eventually erodes too much material away and the performance is reduced. The details of how activation affects pore structure can be seen by looking at the $N_2$ isotherms for the four samples noted in FIG. 8.

Figure 9:
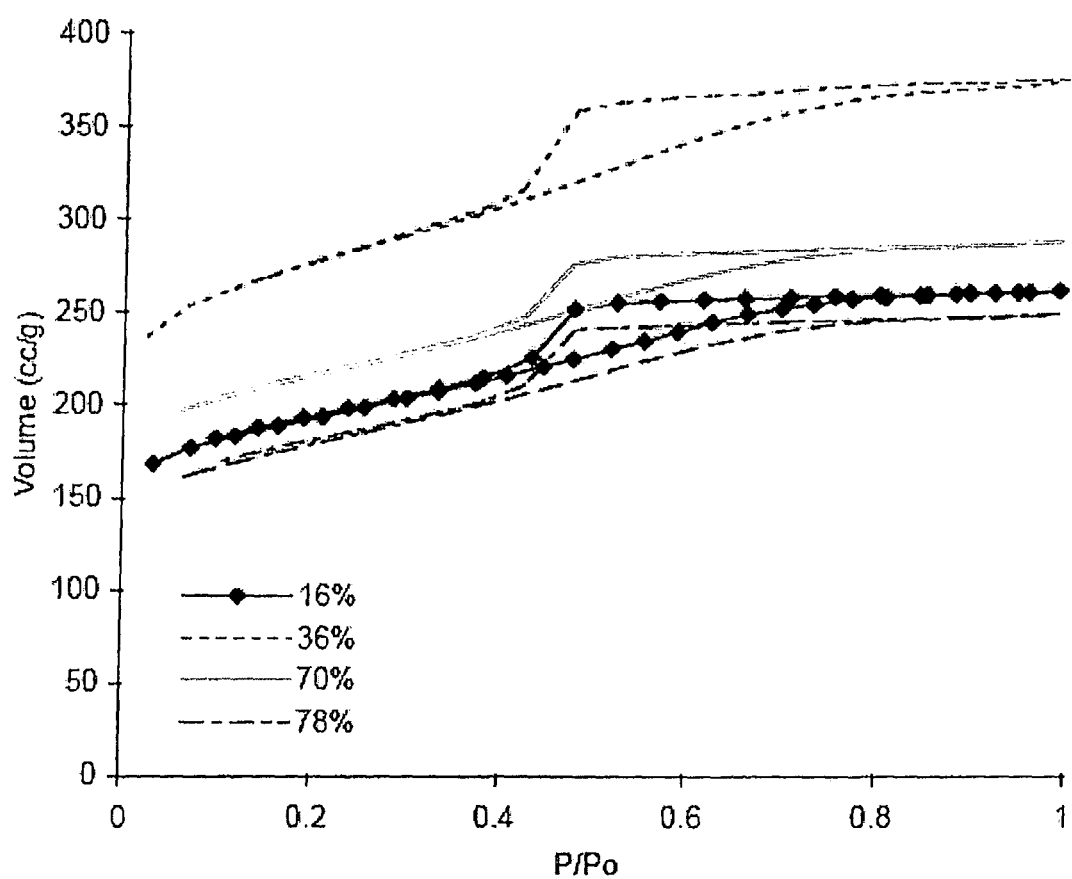
FIG. 9 is a graph of nitrogen sorption isotherms for four samples with the same R/C value activated to four different levels.

FIG. 9 shows the isotherms for the same four samples shown in FIG. 8. At first glance all the isotherms appear to be nearly identical, but existing at a somewhat different pore volume which is what might be expected from FIG. 8 A. Both the micropore volume and overall pore volume increase as the sample is activated up to a maximum at 36% activation. Then as the activation continues, the structure is eroded and the micropore and total pore volume is decreased. Upon closer inspection, there is also a more subtle change that can be extracted from the isotherm data. It is obvious that the micropore volume and the total pore volume increases and then decreases, but the same happens with the mesopore volume. By subtracting the total pore volume (volume of $N_2$ adsorbed at 1 atm) from the pore volume at the onset of the mesopore hysteresis (volume of $N_2$ adsorbed at about 0.4 atm), the change in that range of mesopore volume can be assessed. For these samples, that difference changes from 45 cc/g to 65 cc/g as activation goes from 16% to 36%, and then the same pore volume decreases back down to 47 cc/g and finally back to 45 cc/g as activation further increases to 70% and 78% respectively. From a more qualitative standpoint, it is also evident that the 36% activation sample has a longer and wider hysteresis loop indicating more developed mesoporosity. This may explain why a 40% increase in the microporosity of the 16% activated sample from 170 cc/g to 240 cc/g for the 36% activated sample is accompanied by a more than doubling of the capacitance from 38 F/g to 85 F/g respectively. Without being bound by theory, it appears that the significant increase in the mesoporosity of the sample allows ions easier access to the high surface area of the micropores and the active surface area is increased, which results in much higher capacitance.

In order to allow ion transport while maintaining high surface area and high capacitance, mesopores or large micropores are should be present in addition to smaller micropores. In our system this is facilitated by activation—to expose micropores—of an inherently mesoporous framework. In order to further understand this, a quick look at the structure of the carbon cryogel before during and after activation is helpful. It has been well documented that R/C has an impact on the mesopore structure of carbon aerogels and cryogels. [22, 23] SAXS (Small Angle X-ray Scattering) studies also revealed that concealed micropores exist in carbon aerogels [24] (and cryogels by association), but these carbon structures have not displayed sufficient accessible microporosity to perform well as supercapacitor electrodes. However, activated carbon aerogels [25] and activated carbon cryogels [5] have open micropores which allow the significant microporosity of these materials to be utilized for possible electrolyte penetration. By adjusting the amount of catalyst in the initial sol, the structure of the polymer precursor material can be tuned and the microstructure of the final carbon modified. However, during the pyrolysis process (heating to 1050° C. under flowing $N_2$) a sintering like effect occurs. As the polymer transforms to carbon, a mesoporous super structure develops, but the micropores described above are concealed by the relative mobility of the material at these temperatures and a tendency to reduce surface energy. Activation is then required at somewhat lower temperatures to remove the smoothed over surface and reveal the micropores below. Activation occurs by a reaction between carbon and $CO_2$ at 900° C. as shown in Equation 7.

$$C+CO_2 \rightarrow 2CO \qquad \text{Equation 3}$$

This process strips away carbon from any accessible surface. Starting from the outside of the mesoporous frame work that exists after pyrolysis, the activation process erodes the surface of these mesopores. This gradually increases the number of exposed micropores, hence increasing surface area and capacitance. When the surface of the newly exposed micropores begins to react under the stream of $CO_2$, that process likely begins at points protruding from the pore wall, such as necks or obstructions. In this way, it is generally expected that extensive activation will smooth the pore walls and eliminate the likelihood that certain regions are in accessible to molecules (or ions) larger than $CO_2$. After micropores have been exposed and surfaces smoothed by this gaseous reactant, the next most active site is likely the entrance to the micropores themselves at the surface of the mesopores. As this material erodes, the overall bulk of the carbon cryogel matrix begins to disappear and the performance decreases due to decreasing over all porosity.

Our research has shown that this activation process occurs differently depending on R/C or R/W. This is not surprising, since the sol-gel parameters result in starting materials with different surfaces topology.

In addition to the ability of activation to reduce obstructions, the above-mentioned tendency of R/C or R/W to alter the mesoporous structure also has an impact on access to micropores. The longer a particular micropore, the more likely an obstruction or contortion is to prevent access by electrolyte molecules. High power EDLC capacitors function better if the electrolyte is able to move relatively unobstructed. Micropores enhance the surface area and hence the capacitance, but must be supplemented by a network of larger mesopores to facilitate fast charge and discharge rates [26] while increasing pore accessibility. In considering this concept, carbon cryogels offer yet another benefit. By changing the R/C and R/W ratio, the mesoporous frame work is controlled and the thickness of the pore walls is adjusted—usually from about 3 to about 10 nm. When the micropores inside these pore walls are revealed by activation, the pore length is limited by the wall thickness of the mesopores. Hence micropore length is limited to around half the thickness of the mesopores wall or only a few nanometers—thus ensuring rapid charge and discharge through easy ion access.

Figure 10:
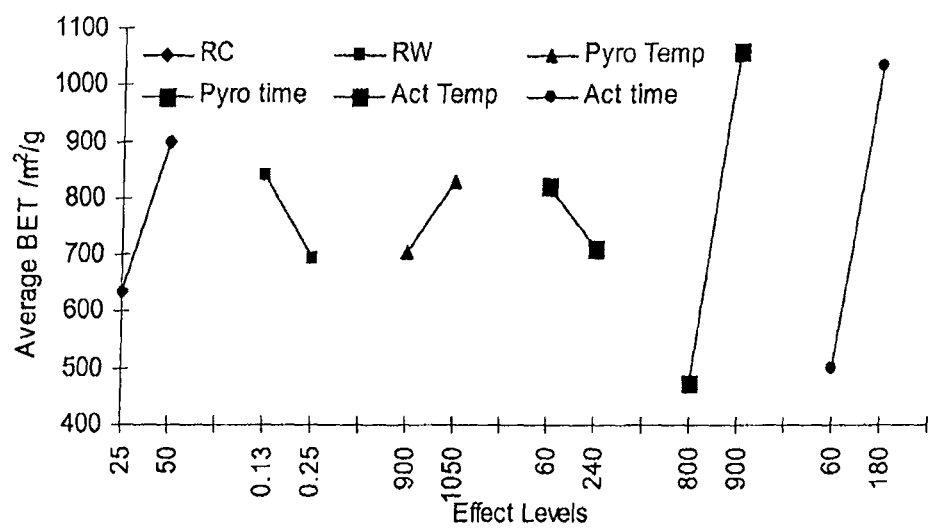
FIG. 10 is a Ybar marginal means plot with BET surface area as a response. High low values for each variable are shown on the x-axis and average BET surface area is shown on the y-axis.

The above results demonstrate activated carbon cryogel super capacitor electrodes are capable of very high performance even when only R/C and percent activation are used as variables to control their pore structure. However, there are other variables that likely have an impact on the structure and hence the capacitance of the material. Using the standard scientific approach where one variable modified while all others are maintained at a constant value is simple and elegant, but when multiple variables are involved it can become rather complicated and even confusing to determine how important each variable is in light of changes in other variables. It is often difficult to ascertain whether or not variables interact with each other. However, by using a statistical approach along with a factorial design of experiments as demonstrated herein, the impact of variables can be assessed relative to each other and interactions can be measured. Table 1 shows the range of variables that were utilized in the following study. FIG. 10 shows the output of the DOE Pro software when BET surface area is used as the response. The surface area of each of the twelve samples shown in Table 1 is input into the software and the results are shown. FIG. 10 shows that the activation variables and R/C are the most dominant in determining the surface area. It should be noted that the R/C values were only varied between 25 and 50 which should provide a high surface area but as seen in FIG. 4 does not induce a significant difference in surface area. Nonetheless, this variable—after activation—appears to have the strongest impact on surface area. We can also see that R/W, pyrolysis time and pyrolysis temperature have smaller but noticeable effects. The chart essentially provides an optimum recipe for producing the highest surface area sample: R/C 50; R/W 0.13; 1050° C. pyrolysis temp with 60 minute dwell; and 900° C. activation temp for 180 minutes.

Figures 11A, 11B, 11C:
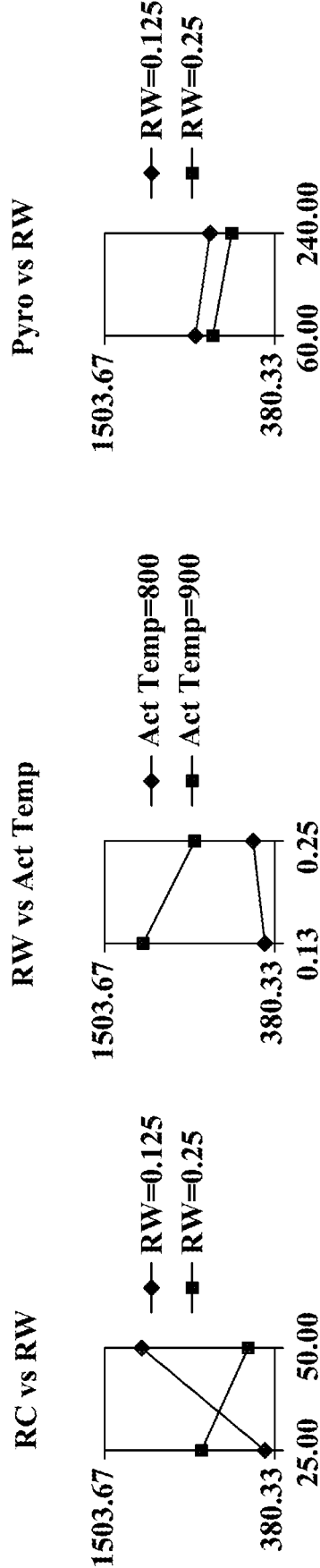
FIG. 11A is a graph of the interaction for RC and RW for a sample of four interaction plots using the Taguchi L12 approach with BET surface area as a response.
FIG. 11B is a graph of the interaction for RW and activation temperature for a sample of four interaction plots using the Taguchi L12 approach with BET surface area as a response.
FIG. 11C is a graph of the interaction for pyrolysis time and RW for a sample of four interaction plots using the Taguchi L12 approach with BET surface area as a response.

In addition to the average impact of each variable, large set of interaction plots is provided. The Taguchi L12 produces 36 interaction responses for each response. FIG. 11 provides a sample of three of them which have strong, moderate and low interactions. FIG. 11 a shows the interaction between RC and RW. It is evident that for an RW of 0.125, the RC 50 value is better, but for an RW value of 0.25, the RC of 25 is better. This is considered a strong interaction and the relationship between RC and RW. FIG. 11b shows the moderate interaction between activation temperature and RW. For low activation temperature, it is best to have an RW of 0.25, but it doesn't matter too much because there is only a slight increase from one to the other. However, for an activation temperature of 900° C., it is preferable to choose the lower RW value because there is a fairly strong decrease in surface area with an increase in RW. FIG. 11c suggests that there is minimal interaction between RW and pyrolysis time. For either value of RW it appears better to have the low pyrolysis time. These charts provide a wealth of information that can be used to optimize the performance of this system to specific metrics.

Figure 12:
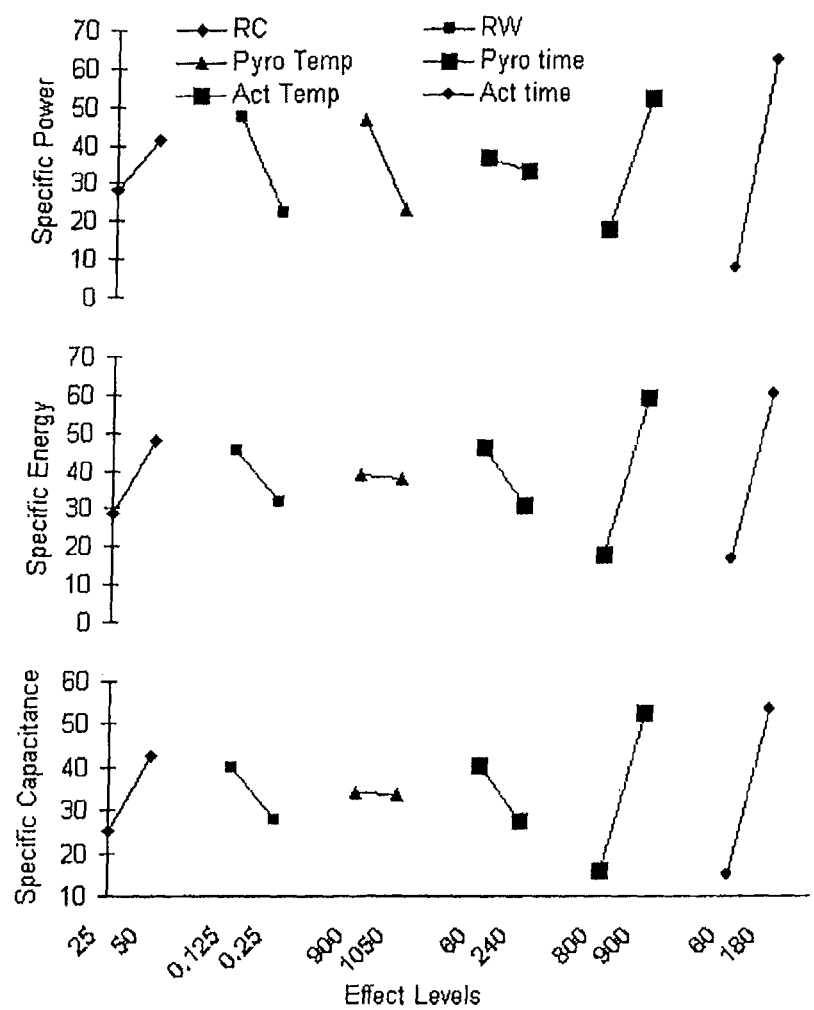
FIG. 12 is a Ybar marginal means plots with responses for specific power; specific energy; and specific capacitance.

However, it is worth taking a look at some of the other Ybar marginal means plots, as they provide a fairly concise summary of the impact of each factor. FIG. 12 shows the Ybar marginal means plots for specific power, energy, and capacitance. They are all in relatively good alignment with each other demonstrating that manipulating the variables to achieve good performance in all three of these metrics is not unreasonable. However, the charts show some subtle differences between the three. The activation parameters are generally all important, but RW and pyrolysis temperature appear to be a stronger influence on specific power whereas RC and pyrolysis time have more of an impact on capacitance and energy. By using the information in these charts and the vast data in the interaction plots, it is expected it is possible to tune for specific performance such as increasing energy while slightly sacrificing power or vice versa depending on the desired outcome.

Results from Electrochemical Analysis and Capacitance Measurements Using Impedance Spectroscopy Table 3 and Table 4 list test results for the capacitors.

TABLE 3

Test results after conditioning at 1.0 V for the prototype capacitors. (C500-500 Ω charging capacitance)

| | 1 kHz | @ 1.0 V | 30 min leakage current (µA) | |
|---|---|---|---|---|
| ID | ESR (Ω) | C500 (F) | 0.5 V | 1.0 V |
| 1 | 1.449 | 0.23 | 0.8 | 2.4 |
| 2 | 1.979 | 0.18 | 0.9 | 2.9 |

TABLE 1

Test results after conditioning at 2.0 V for the prototype capacitors. Specific capacitance is on a dry-weight basis. (C500-500 Ω charging capacitance)

| | 1 kHz | @2.0 V | 30 min leakage current (µA) | | F/g |
|---|---|---|---|---|---|
| ID | ESR (Ω) | C500 (F) | 1.5 V | 2.0 V | @ 2.0 V |
| 1 | 1.420 | 0.26 | 7.4 | 12.3 | 107 |
| 2 | 1.582 | 0.19 | 6.2 | 9.8 | 106 |

Figure 13:
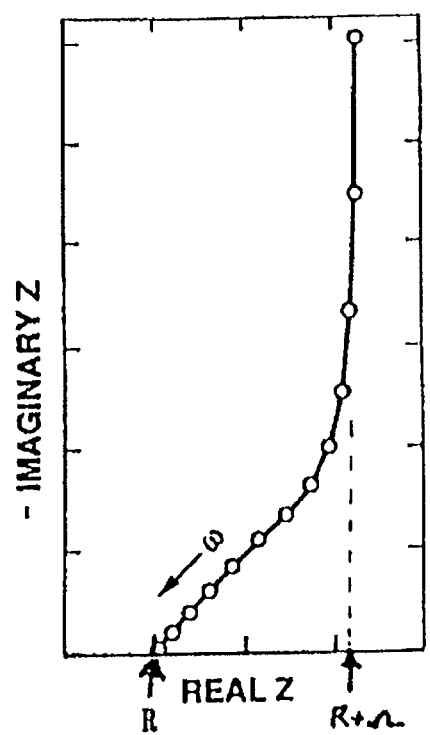
FIG. 13 is a complex plane representation of impedance data for a capacitor with porous electrodes.

Before reviewing the electrochemical impedance spectroscopy (EIS) results for these samples, it is useful to look at the EIS response of an ideal porous electrode. FIG. 13 is a complex plane representation of impedance data for a capacitor with porous electrodes. R is the equivalent series resistance and Ω the ionic resistance due to the pores, and shows the complex plane representation of EIS data for an electrode made up of right cylindrical pores. The equivalent series resistance, R, is due to the ionic resistance of the electrolyte in the separator plus the electronic resistance of the completing circuit. The ionic resistance in the separator depends on the thickness of the separator and the conductivity of the electrolyte. The electronic resistance of the circuit includes the bulk resistance of all materials and the contact resistances between all materials.

The impedance of a series-RC circuit in a complex plane representation would be a straight vertical line that intersects the real axis at the value of the equivalent series resistance, R. Devices with porous electrodes exhibit a rise for a short distance from the real axis at an angle of ~45 degrees because of distributed charge storage. The line after the 45° rise is vertical. The projection of the 45° line on the real axis, here labeled Ω, is the ionic resistance within the porous structure. Assuming a porous electrode comprised of uniform diameter right cylinder pores filed with an electrolyte of conductivity, κ.

$$\Omega = \frac{l^2}{2V\kappa} = \frac{l^2}{rS\kappa} \qquad \text{Equation 8}$$

where l is the length of the pore, κ=electrolyte conductivity, V=pore volume, r=pore radius, and S=2πrln where n=number of pores. Ω is influenced by pore geometry and electrolyte conductivity.

Figures 14A, 14B:
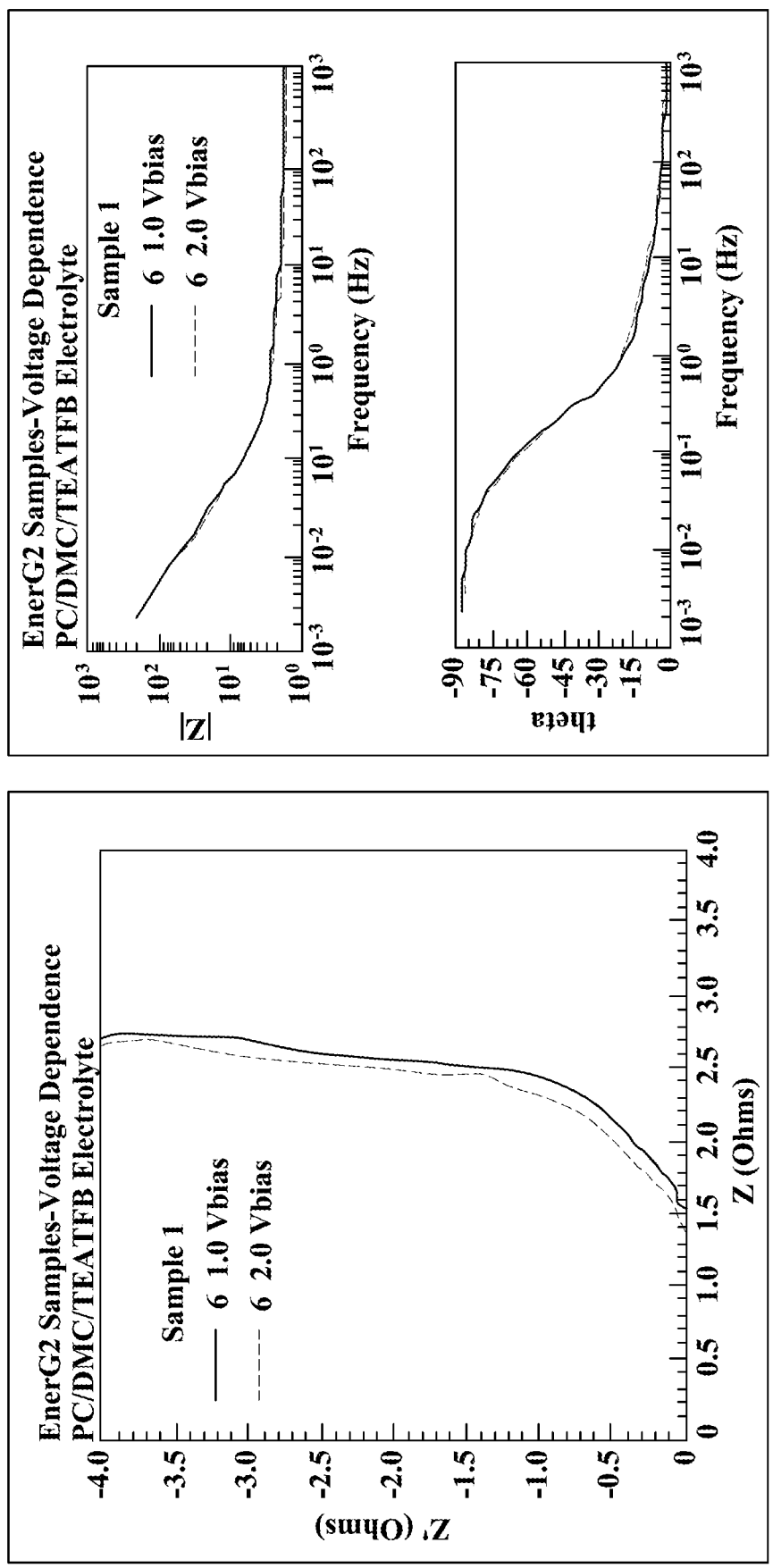
FIGS. 14A-C provide the impedance data for sample 1. There is little voltage bias effect for this sample.
Figures 15A, 15B:
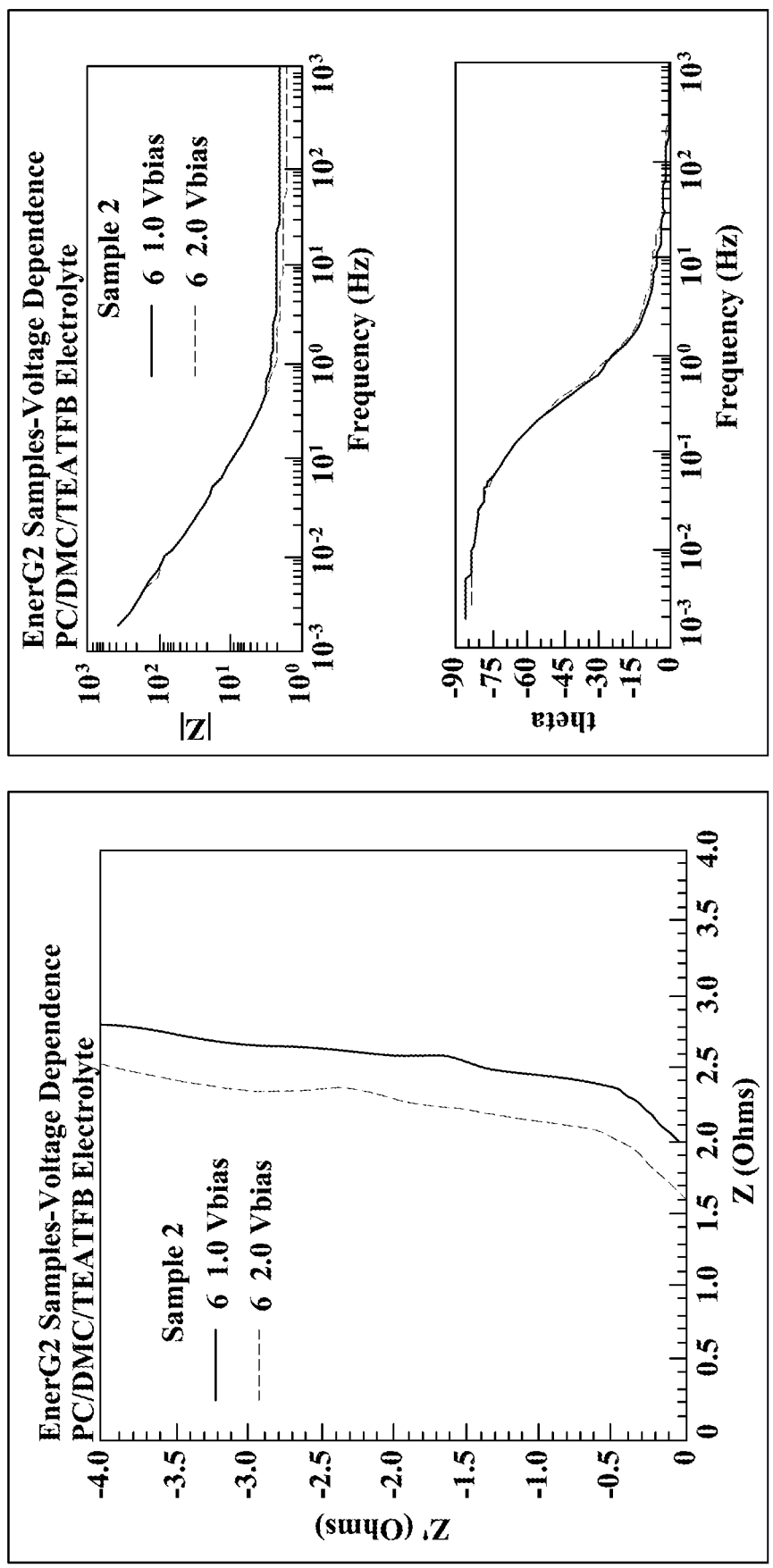
FIGS. 15A-C provide impedance data for sample 2. The effect of voltage for this sample was to move the complex plane line to the left which decreased the ESR. The shift in the complex plane plot probably is not significant and may be due to a small decrease in the electronic resistance.

FIG. 14a and FIG. 15a shows impedance data in a complex-plane representation for the test capacitors at bias voltages of 1.0 V and 2.0 V. Both samples show typical porous electrode behavior. Sample 2 has the least ionic resistance in the pores (about 0.5Ω). That is, the length of the down projection of the complex plane curve to the real axis is about 0.5Ω. Sample 1 has a higher value, about 0.8Ω. Most carbon samples display an ionic resistance value that increases substantially when the bias voltage is increased from 1 V to 2 V, but these samples did not show this behavior.

Referring to Equation 8, the reason for the larger Ω for other carbons compared to samples 1 and 2 may be due to their having longer pores and/or smaller pore volume. The bias dependence of Ω (larger at higher voltage) suggests that the reason may be smaller pore volume in other carbons compared to these two.

FIG. 14b and FIG. 15b show the same impedance data in a Bode representations, which is the magnitude of the impedance |Z| and the phase angle versus frequency. The devices do not store any energy at high frequencies but "turn on" as the frequency is decreased. Capacitive behavior is evident by the −1 slope at lower frequencies and an increase in the phase angle, with this approaching −90 degrees at low frequencies. The samples that "turn on" at high frequencies have faster response and more energy storage capability at shorter times, i.e. more powerful.

Figure 14C:
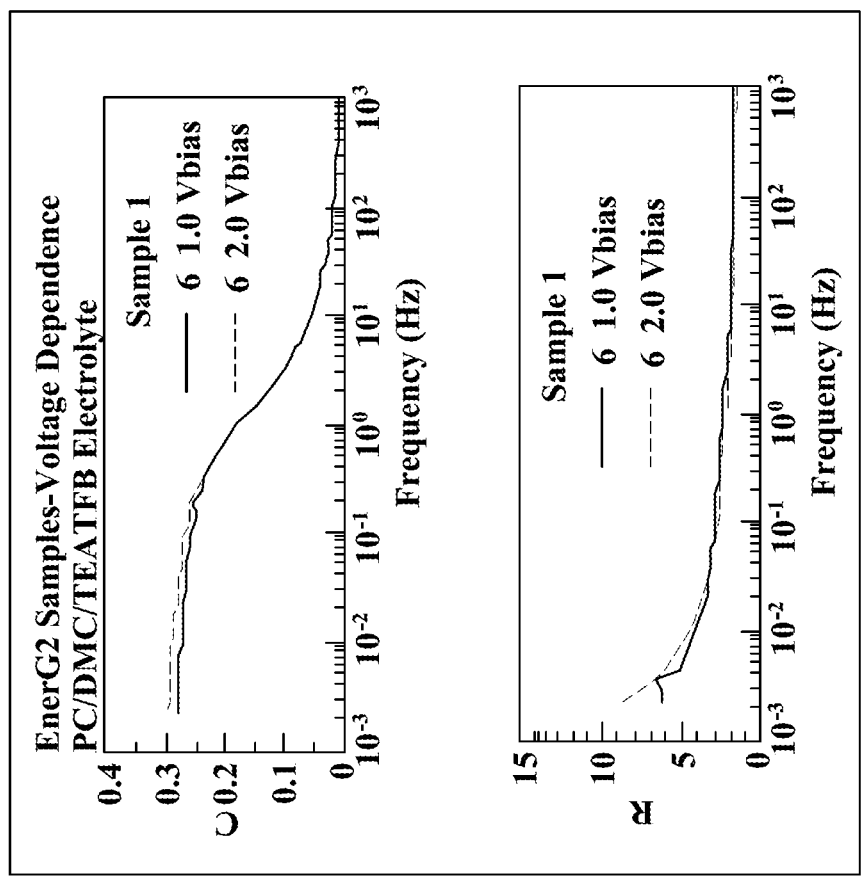
Figure 15C:
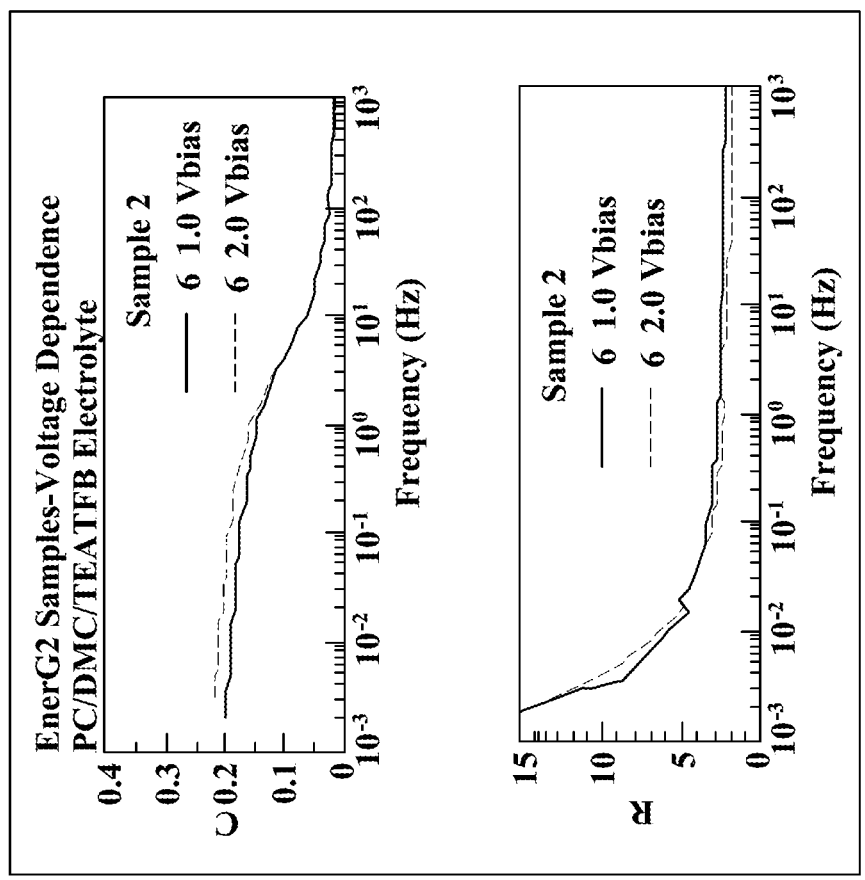

FIG. 14c and FIG. 15c show the same data in yet another representation—assuming the device can be represented by a series-RC circuit. The capacitance is calculated as −1/(2πfZ"), where f is the frequency in Hz, Z" is the reactance, and π=3.1415. As shown, the capacitance increases from a minimum at about 200 Hz in a monotonic fashion as the frequency is reduced, reaching saturation values at 2.0 V bias of 0.2 F for sample 2, and 0.3 F for sample 1. The series resistance has a minimum value at about 1 kHz and increases as the frequency is reduced. This type behavior is characteristic of a porous electrode, where the resistance increases at low frequencies as charge storage occurs in deeper pores through longer paths of electrolyte.

Figure 16:
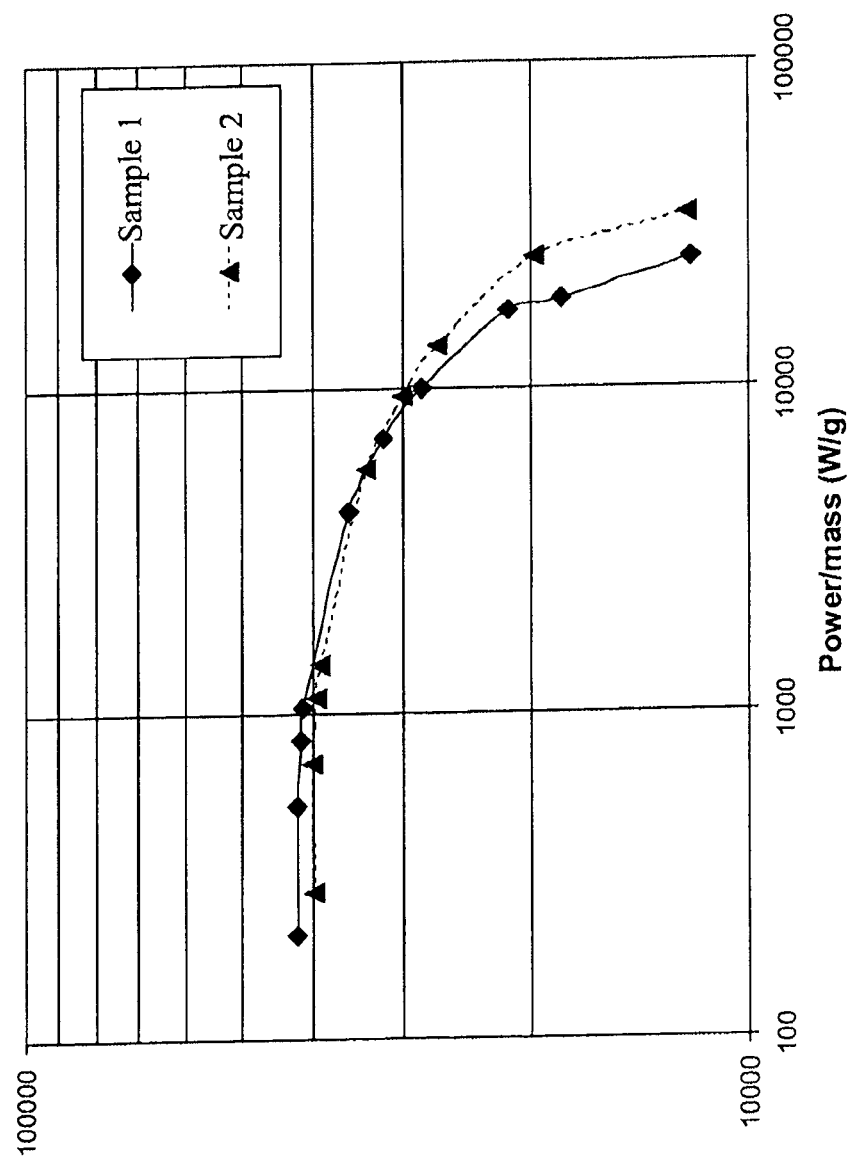
FIG. 16 is a Ragone plot of experimentally determined energy-power relationship.

One way to show and compare performance of energy storage devices is the energy-power relationship of a Ragone plot as shown in FIG. 16. The energy that can be delivered by the device decreases with an increase in delivery rate. The energy and power values shown in the figure were measured using a constant power discharges from 2.0 V to 1.0 V. The maximum specific power measured for each sample is listed in Table 5. Note, these are not the maximum power values possible but are the endpoint values for the curves shown in FIG. 9. Higher power values could have been measured. This representation of technology performance is useful but quite limited. For instance, it is valid only for a fully charged device and requires a full discharge of the device, often not encountered in a capacitor application. Often a partial discharge occurs in an application followed by a second partial discharge. That second discharge will not lie on the same curve as the first discharge.

Furthermore, storage device charging is more important than its discharging in some applications. Thus, the Ragone plot is not useful when comparing technologies, particularly when batteries are included, because they generally charge and discharge differently due to different chemical reaction rates.

TABLE 5

Maximum specific powers determined from constant power discharge data from 2.0 V to 1.0 V for the test capacitors and PC/DMC/TEATFB electrolyte.

| Sample | Maximum measured Specific Power (W/g) |
|---|---|
| 1 | 25 |
| 2 | 34 |

Note the test capacitors were fabricated using a PC/DMC based electrolyte instead of an acetonitrile-based electrolyte used in many commercial capacitors. The conductivity of the acetonitrile-based electrolyte is higher by almost a factor of five and thereby causes a decrease in ESR that may allow a factor of five increase in maximum power. Nevertheless, the comparison of the materials is valid since both were evaluated using the same electrolyte.

There are other methods to evaluate and compare electrochemical capacitors (ECs) for various applications. One way to compare EC technologies for hybrid vehicle applications is to determine the quantity of energy capture and the efficiency of energy capture during regenerative braking ("regen"). [28] This regen energy capacitor test provides better information on device performance in a hybrid vehicle. It measures the quantity of energy the device captures during charging and then again what fraction of the energy captured was stored and then available to accelerate the vehicle when it proceeds after the stop. Batteries generally do poorly on the test. Again, the regen capture test provides a measure to compare one important aspect of performance.

The prototype capacitors fabricated from the activated carbon cryogel samples were evaluated for their ability to capture energy as a function of charge time using constant current charge. Each cell was held at 1.25 V for 30 s, then charged to 2.5 V, and then the voltage of the cell was measured after 30 s open circuit (during which time the voltage decreased or bounced back). The energy in the charge from 1.25 V to 2.5 V can be considered regenerative capture energy (or energy available to store) and was determined from the current, voltage, and time of charge to 2.5 V.

The energy actually stored in the device was determined by the voltage after 30 s open circuit. At charge times in the 3-30 s range, this test mimics the performance expected by a storage capacitor during hybrid vehicle braking.

Figure 17:
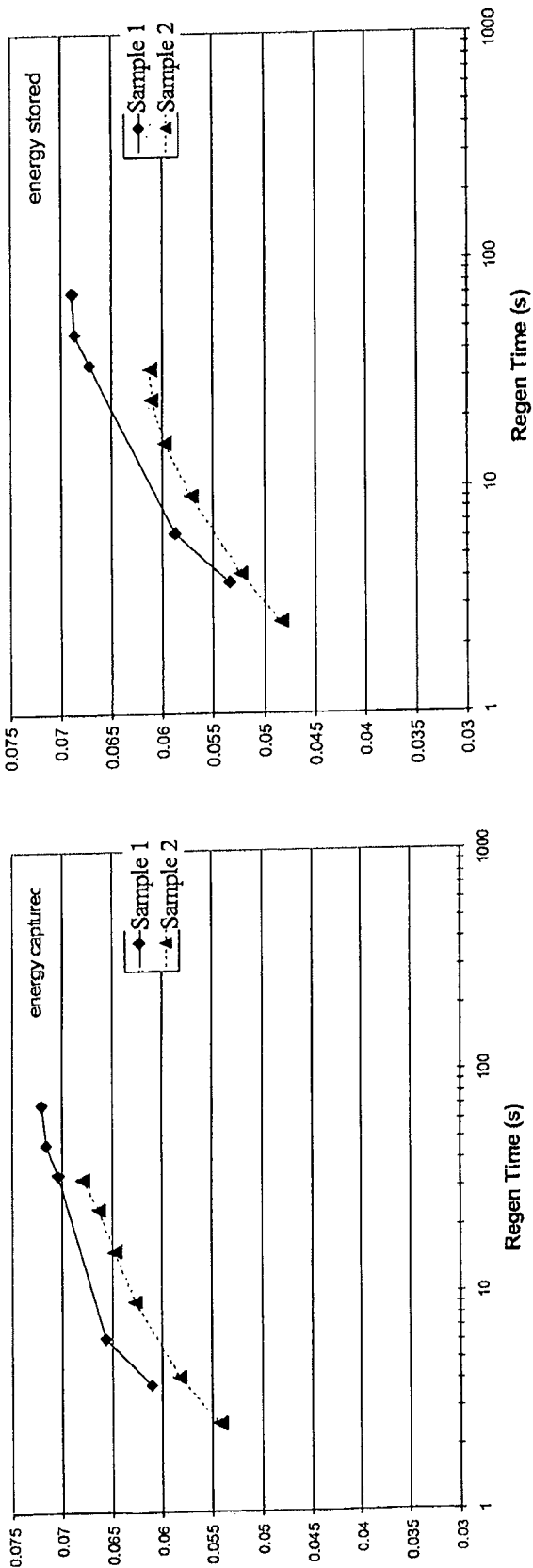
FIG. 17 is a graph of captured energy (left) and stored energy (right) on a mass basis by the four test capacitors.

FIG. 17 shows the captured and stored energies for each test cell at charge times ranging from about 2 s to about 70 s. The curves on the left are the captured energy and curves on the right are the energy stored in the cell during the regen charge. Generally, as the charge times are decreased (higher charge rates), less of the energy is stored.

FIG. 18 shows the ratio of the possible to actual stored energy and is effectively the regen energy acceptance efficiency of each device. This ratio is important because it can strongly affect the balance of system design and costs. Low efficiency means more heat was generated, which must be removed to prevent overheating of the storage devices. With low efficiency, additional cost, volume, and mass may be required for an active cooling for thermal management. Thus, the effects of having high efficiency are multiplied in applications having substantial cycling.

Another way to compare EC technologies, appropriate for example, for digital communication applications, is to determine energy available at different response times pertinent to pulse power performance. This is done by calculation of a Figure of Merit (FOM) determined using electrochemical impedance spectroscopy data. [29] This FOM is useful when comparing ECs for portable electronic applications such as for communications, digital cameras, and instant-on computing.

The FOM is determined from EIS data, specifically from the energy stored at the frequency at which the −45 degree phase angle is reached. The calculated capacitance at this frequency, assuming a series-RC circuit, is $C=-1/(2\pi f_o Z'')$ and the energy is ½ CV2. These FOMs described the rate at which the energy in the capacitor is available, an important consideration for pulse power applications. Table 6 lists FOMs for the tested sample materials. Generally, the larger the FOM values, the more suitable the material for pulse applications.

TABLE 6

Calculated gravimetric Figure of Merit (FOM) of carbon cryogel electrode material in a test sample with organic electrolyte at a voltage of 2.0 V. Mass is for the two dry electrodes only. Packaged devices are expected o have values reduced tby two to four times.

| Sample | $F_0 = -45$ deg. freq. (Hz) | Reactance @ −45° (Ω) | C-1/(2pi ImZ Hz) (F) | E/M (J/g) | Gravimetric FOM (W/g) |
|---|---|---|---|---|---|
| 1 | 0.250 | 2.577 | 0.247 | 51.4 | 13 |
| 2 | 0.389 | 2.449 | 0.166 | 47.0 | 18 |

It is sometimes difficult to compare these FOMs directly to FOMs of commercial devices because of electrolyte mass and packaging mass and volume. Also the FOMs shown in Table 5 were developed for 2.0 V using a PC/DMC/TEATFB electrolyte, while most commercial ECs with organic electrolyte used acetonitrile/TEATFB and are rated at higher voltages.

Applicants have provided examples of activated carbon cryogels as EDLC electrode material. These results have shown high power and energy density with high capacitance. In addition it has been shown that by modifying the sol-gel parameters as well as activation levels in carbon cryogels, provides a cryogel possessing tunable mesoporosity to easily deliver electrolyte to the surface and enhance kinetics; controllable micropore volume and size distribution to maximize the useable surface per unit weight; activation to allow thorough access to the micropores ensuring the good surface area and capacitance, and finally micropore lengths that are short and also adjustable allowing excellent charge and discharge kinetics. In addition to RC and activation level, it was shown by a statistical approach that all variables used in processing carbon cryogels do have some impact on their performance.

All references cited herein are incorporated by reference as if each had been individually incorporated by reference in its entirety. In describing embodiments of the present application, specific terminology is employed for the sake of clarity. However, the invention is not intended to be limited to the specific terminology so selected. Nothing in this specification should be considered as limiting the scope of the present invention. All examples presented are representative and non-limiting. The above-described embodiments may be modified or varied, without departing from the invention, as appreciated by those skilled in the art in light of the above teachings. It is therefore to be understood that, within the scope of the claims and their equivalents, the invention may be practiced otherwise than as specifically described.

REFERENCES

1. Gouerec P, Talbi H, Miousse D, Tran-Van F, Dao L H, Lee K H. "Preparation and modification of polyacrylonitrile microcellular foam films for use as electrodes in supercapacitors." *Journal of the Electrochemical Society* 2001; 148(1):A94-101.
2. Lozano-Castello D, Cazorla-Amoros D, Linares-Solano A, Shiraishi S, Kurihara H, Oya A. *Carbon.* 2003; 41:1765.
3. Hu C-C, Wang C-C., Effects of electrolytes and electrochemical pretreatments on the capacitive characteristics of activated carbon fabrics for supercapacitors." *Journal of Power Sources* 2004; 125(2):299-308.
4. Qu D, Shi H. "Studies of activated carbons used in double-layer capacitors." *Journal of Power Sources.* 1998; 74(1):99-107.
5. Feaver A, Cao G. "Activated carbon cryogels for low pressure methane storage." *Carbon.* 2006; 44(3):587-93.
6. Eikerling M, Kornyshev A A, Lust E. "Optimized structure of nanoporous carbon-based double-layer capacitors." *Journal of the Electrochemical Society.* 2005; 152(1):E24-33.
7. Endo, M. Kim, Y. J. Ohta, H. Ishii, K. Inoue, T. Hayashi, T. Nishimura, Y. Maeda, T. Dresselhaus. M. S. *Carbon.* 40, 2002, 2613.
8. Setoyama, N. Suzuki, T. Kaneko, K. *Carbon.* 36, 1998, 1459.
9. Hsieh, C-T. Lin, Y-T. *Microporous and Mesoporous Materials.* 93, 2006, 232.
10. Xie, J. Wang, X. Deng, J. Zhang, L. *Applied Surface Science.* 250, 2005, 152.
11. Yang, J. Shen, Z. Hao, Z. *Carbon.* 42, 2004, 1872.
12. Kowaiczyk, P. Terzyk, A. P. Gauden, P. A. Leboda, R. Szmechtig-Gauden, E. Rychlicki, G. Ryu, Z. Rong, H. *Carbon.* 41, 2003, 1113.
13. Khomenko, V. Raymundo-Pinero, E. Frackowiak, E. Begun, F. *Applied Phys. A.* 82, 2006, 567.
14. Barbieri O, Hahn M, Herzog A, Kotz R. *Carbon.* 2005; 43:1303.
15. Robinson, R. A. Stokes, R. H. *Electrolyte Solutions* 2nd ed. Revised, Butterworths, London (1970).
16. Edward, J. T. *J. Chemistry Education.* 47, 1970, 261.
17. Conway, B. E. Verall, R. E. DesNoyers, J. E. *Trans. Faraday Soc.* 62, 1966, 2738.
18. Endo, M. Kim, Y. J. Ohta, H. Ishii, K. Inoue, T. Hayashi, T. Nishimura, Y. Maeda, T. Dresselhaus. M. S. *Carbon,* 40, 2002, 2613.
19. Ue, M. *J. Electrochemical Society.* 141, 1994, 3336.
20. Salitra, G. Soffer, A. Eliad, L. Cohen, Y. Aurbach, D. *J. Electrochemical Soc.* 147, 2000, 2486.
21. Ding, Jow, T. R. *J. Electrochemical Society.* 151, 2004, A2007.
22. Pekala R W Schaefer D W. "Structure of organic aerogels: morphology and scaling." *Macromolecules.* 1993; 26(20):5487.
23. Kocklenberg R, Mathieu B, Blacher S, Pirard R, Pirard J P, Sobry R, Van den Bossche G. "Texture control of freeze-dried resorcinol-formaldehyde gels." *Journal of Non-Crystalline Solids.* 1998; 225:8-13.
24. Reichenauer G, Emmerling A, Frick J, Pekala R W. "Microporosity in carbon aerogels." *Journal of Non-Crystalline Solids.* 1998; 225:210-214.
25. Wei Y Z, Fang B, Iwasa S, Kumagai M. "A novel electrode material for electric double-layer capacitors." *Journal of Power Sources.* 2005; 141(2):386-391.
26. Eikerling M, Kornyshev A A, Lust E., Optimized structure of nanoporous carbon-based double-layer capacitors." *Journal of the Electrochemical Society.* 2005; 152(1):E24-33.
27. Peter I. Ravikovitch, Aleksey Vishnyakov, Ron Russo, and Alexander V. Neimark "Unified Approach to Pore Size Characterization of Microporous Carbonaceous Materials from $N_2$, Ar, and $CO_2$ Adsorption Isotherms" *Langmuir* 16 (2000) 2311.
28. Miller, J. R. et al., "Braking Performance Test Procedure for Hybrid Vehicle Energy Storage Systems: Capacitor Test Results," Abstract 684. Joint International Meeting of the Electrochemical Society, Honolulu, Hi., Oct. 3-8, 2004.
29. Miller, J. R. et al., "Pulse Power Performance of Electrochemical Capacitors: Technical Status of Present Commercial Devices," Proc. 8th International Seminar on Double Layer Capacitors and Similar Energy Storage Devices, Deerfield Beach, Fla. (Dec. 7-9, 1998).
30. Pekala, R. W. "Organic aerogels from the polycondensation of resorcinol with formaldehyde." *Journal of Materials Science* 1989 24(9):3221-7.
31. Tamon, H., et al. "Preparation of mesoporous carbon by freeze drying" *Carbon* 1999 37(12):2049-2055.

What is claimed:
1. An electrode comprising a binder and activated carbon, wherein the activated carbon comprises:
a surface area of greater than 1500 $m^2/g$, as determined by nitrogen sorption at 77 K and BET analysis; and
a pore structure comprising mesopores having a diameter ranging from 2.0 nm to 10.0 nm and a pore volume ranging from 0.01 cc/g to 0.25 cc/g for pores having a pore diameter of 0.6 nm to 1.0 nm, as determined from $N_2$ sorption derived DFT,
wherein the electrode has a specific capacitance of at least 100 F/g and a specific power of at least 25 W/g when each of the specific capacitance and specific power is measured in an electric double layer capacitor device comprising an electrolyte comprising equal volumes of propylene carbonate and dimethylcarbonate and further comprising 1.0 M tetraethylammonium tetrafluoroborate.

2. The electrode of claim 1, wherein the electrode is a component in a supercapacitor, an ultracapacitor, an electric double layer capacitor or a pseudo capacitor.

3. The electrode of claim 1, wherein the binder is selected from polytetrafluorethylene, perfluoroalkoxy polymer resin, fluorinated ethylene-propylene, polyethylenetetrafluoroethylene, polyvinylfluoride, polyethylenechlorotrifluoroethylene, polyvinylidene fluoride, polychlorotrifluoroethylene, and trifluoroethanol.

4. The electrode of claim 1, wherein the pore structure comprises:
   a pore volume ranging from 0.01 cc/g to 0.15 cc/g for pores having a diameter less than 0.6 nm;
   a pore volume ranging from 0.30 cc/g to 0.70 cc/g for pores having a diameter between 1.0 nm and 2.0 nm;
   a pore volume ranging from 0.15 cc/g to 0.70 cc/g for pores having a diameter between 2.0 nm and 4.0 nm;
   a pore volume ranging from 0.06 cc/g to 0.50 cc/g for pores having a diameter between 4.0 nm and 6.0 nm; and
   a pore volume ranging from 0.01 cc/g to 0.30 cc/g for pores having a diameter between 6.0 nm and 8.0 nm; and
   wherein the pore volumes are determined from $N_2$ sorption derived DFT.

5. The electrode of claim 1, wherein the specific capacitance ranges from 100 F/g to 130 F/g.

6. The electrode of claim 1, wherein the specific power ranges from 25 W/g to 35 W/g.

7. The electrode of claim 1, wherein the activated carbon has a surface area greater than 2000 $m^2$/g, as determined by nitrogen sorption at 77K and BET analysis.

8. An Electric Double Layer Capacitor (EDLC) device comprising:
   a) a positive electrode and a negative electrode, wherein each of the positive and the negative electrodes comprise activated carbon;
   b) an inert porous separator; and
   c) an electrolyte;
   wherein the positive electrode and the negative electrode are separated by the inert porous separator, and wherein the activated carbon comprises:
   a surface area of greater than 1500 $m^2$/g, as determined by nitrogen sorption at 77 K and BET analysis; and
   a pore structure comprising mesopores having a diameter ranging from 2.0 nm to 10.0 nm and a pore volume ranging from 0.01 cc/g to 0.25 cc/g for pores having a pore diameter of 0.6 nm to 1.0 nm, as determined from $N_2$ sorption derived DFT; and
   wherein each of the positive and negative electrodes independently has a specific capacitance of at least 100 F/g and a specific power of at least 25 W/g when each of the specific capacitance and specific power is measured in an electric double layer capacitor device comprising an electrolyte comprising propylene carbonate and dimethylcarbonate and further comprising tetraethylammonium tetrafluoroborate.

9. The EDLC device of claim 8, wherein the specific capacitance of each of the positive and negative electrodes is no more than 150 F/g.

10. The EDLC device of claim 8, wherein the specific capacitance of each of the positive and negative electrodes independently ranges from 100 F/g to 130 F/g.

11. The EDLC device of claim 8, wherein the specific power of each of the positive and negative electrodes independently ranges from 25 W/g to 35 W/g.

12. The EDLC device of claim 8, wherein each of the positive and negative electrodes independently has a specific energy of at least 25 J/g.

13. The EDLC device of claim 8, wherein each of the positive and negative electrodes independently has a specific energy ranging from 38 J/g to 45 J/g.

14. The EDLC device of claim 8, wherein the activated carbon has a surface area greater than 2000 $m^2$/g as determined by nitrogen sorption at 77K and BET analysis.

15. The EDLC device of claim 8, wherein the pore structure comprises a pore volume ranging from 0.30 cc/g to 0.70 cc/g for pores having a diameter between 1.0 nm and 2.0 nm, as determined from $N_2$ sorption derived DFT.

16. The EDLC device of claim 8, wherein the pore structure comprises a pore volume ranging from 0.15 cc/g to 0.70 cc/g for pores having a diameter between 2.0 nm and 4.0 nm, as determined from $N_2$ sorption derived DFT.

17. The EDLC device of claim 8, wherein the pore structure comprises:
   a pore volume ranging from 0.01 cc/g to 0.15 cc/g for pores having a diameter less than 0.6 nm;
   a pore volume ranging from 0.30 cc/g to 0.70 cc/g for pores having a diameter between 1.0 nm and 2.0 nm;
   a pore volume ranging from 0.15 cc/g to 0.70 cc/g for pores having a diameter between 2.0 nm and 4.0 nm;
   a pore volume ranging from 0.06 cc/g to 0.50 cc/g for pores having a diameter between 4.0 nm and 6.0 nm; and
   a pore volume ranging from 0.01 cc/g to 0.30 cc/g for pores having a diameter between 6.0 nm and 8.0 nm; and
   wherein the pore volumes are determined from $N_2$ sorption derived DFT.

18. The EDLC device of claim 8, wherein the pore structure comprises mesopores having a diameter ranging from 2.0 nm to 4.0 nm, as determined from $N_2$ sorption derived DFT.

19. The EDLC device of claim 8, wherein the pore structure comprises micropores having a diameter ranging from 0.3 nm to 2.0 nm, as determined from $CO_2$ sorption derived DFT.

20. An electric double layer capacitor (EDLC) device comprising:
   a) a positive electrode and a negative electrode, wherein each of the positive and negative electrode comprises activated carbon and polytetrafluoroethylene;
   b) an inert porous separator comprising polypropylene, polyethylene or both;
   c) a first and a second current collector each comprising a non-corrosive metal; and
   d) an electrolyte comprising substantially equal volumes of propylene carbonate and dimethylcarbonate and further comprising about 1.0 M tetraethylammoniumtetrafluoroborate,
   wherein the positive and negative electrodes are separated by the porous separator and each is in contact with one current collector, and wherein the activated carbon comprises:
   a surface area of greater than 1500 $m^2$/g, as determined by nitrogen sorption at 77 K and BET analysis; and
   a pore structure comprising mesopores having a diameter ranging from 2.0 nm to 10.0 nm and a pore volume ranging from 0.01 cc/g to 0.25 cc/g for pores having a pore diameter of 0.6 nm to 1.0 nm, as determined from $N_2$ sorption derived DFT; and wherein each of the positive and negative electrodes independently has a specific capacitance of at least 100 F/g and a specific power of at least 25 W/g, as measured in the EDLC device.

21. The EDLC device of claim 20, wherein the specific capacitance of each of the positive and negative electrodes independently ranges from 100 F/g to 130 F/g.

22. The EDLC device of claim 20, wherein the specific power for each of the positive and negative electrodes independently ranges from 25 W/g to 35 W/g.

23. The EDLC device of claim 20, wherein each of the positive and negative electrodes independently has a specific energy ranging from 38 J/g to 45 J/g, as measured in the device.

24. The EDLC device of claim 20, wherein the activated carbon has a surface area greater than 2000 $m^2/g$, as determined by nitrogen sorption at 77K and BET analysis.

* * * * *